(12) United States Patent
Dietle et al.

(10) Patent No.: US 7,770,898 B2
(45) Date of Patent: Aug. 10, 2010

(54) STABILIZING GEOMETRY FOR HYDRODYNAMIC ROTARY SEALS

(75) Inventors: Lannie L. Dietle, Houston, TX (US); John E. Schroeder, Richmond, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 242 days.

(21) Appl. No.: 11/649,693

(22) Filed: Jan. 4, 2007

(65) Prior Publication Data

US 2007/0205563 A1 Sep. 6, 2007

Related U.S. Application Data

(60) Provisional application No. 60/755,975, filed on Jan. 4, 2006, provisional application No. 60/851,937, filed on Oct. 26, 2006.

(51) Int. Cl.
*F16J 15/32* (2006.01)
(52) U.S. Cl. .......................... 277/559; 277/400; 277/574
(58) Field of Classification Search ................. 277/400, 277/559, 573, 574
See application file for complete search history.

(56) References Cited

U.S. PATENT DOCUMENTS

| | | | |
|---|---|---|---|
| 2,188,857 A | | 1/1940 | Chievitz |
| 2,797,944 A | * | 7/1957 | Riesing ...................... 277/573 |
| 3,497,225 A | | 2/1970 | Workman |
| 3,744,805 A | | 7/1973 | Heinrich |
| 3,838,862 A | | 10/1974 | Fern |
| 3,901,517 A | | 8/1975 | Heathcott |
| 3,921,987 A | | 11/1975 | Johnston et al. |
| 3,929,340 A | | 12/1975 | Peisker |
| 3,973,781 A | | 8/1976 | Grörich |

(Continued)

FOREIGN PATENT DOCUMENTS

GB 499480 1/1939

OTHER PUBLICATIONS

Aug. 26, 2008 International Search Report and Written Opinion for counterpart PCT/US2007/60111.

*Primary Examiner*—Alison K Pickard
(74) *Attorney, Agent, or Firm*—Douglas W. Rommelmann; Andrews Kurth LLP

(57) ABSTRACT

A hydrodynamic sealing assembly including a first component having first and second walls and a peripheral wall defining a seal groove, a second component having a rotatable surface relative to said first component, and a hydrodynamic seal comprising a seal body of generally ring-shaped configuration having a circumference. The seal body includes hydrodynamic and static sealing lips each having a cross-sectional area that substantially vary in time with each other about the circumference. In an uninstalled condition, the seal body has a length defined between first and second seal body ends which varies in time with the hydrodynamic sealing lip cross-sectional area. The first and second ends generally face the first and second walls, respectively. In the uninstalled condition, the first end is angulated relative to the first wall and the second end is angulated relative to the second wall. The seal body has a twist-limiting surface adjacent the static sealing lip. In the uninstalled condition, the twist-limiting surface is angulated relative to the peripheral wall and varies along the circumference. A seal body discontinuity and a first component discontinuity mate to prevent rotation of the seal body relative to the first component.

22 Claims, 10 Drawing Sheets

U.S. PATENT DOCUMENTS

| | | | |
|---|---|---|---|
| 3,980,309 A * | 9/1976 | Dechavanne | 277/550 |
| 3,984,113 A | 10/1976 | Bentley | |
| 3,989,259 A * | 11/1976 | Lorenz et al. | 277/574 |
| 4,094,519 A | 6/1978 | Heyn et al. | |
| 4,118,856 A | 10/1978 | Bainard et al. | |
| 4,183,543 A | 1/1980 | Antonini | |
| 4,193,606 A | 3/1980 | Iverson | |
| 4,231,579 A | 11/1980 | Scannell | |
| 4,283,064 A | 8/1981 | Staab et al. | |
| 4,288,083 A | 9/1981 | Braconier | |
| 4,336,945 A | 6/1982 | Christiansen et al. | |
| 4,383,691 A | 5/1983 | Potter | |
| 4,387,902 A | 6/1983 | Conover | |
| 4,399,998 A | 8/1983 | Otto | |
| 4,440,405 A | 4/1984 | Schaus et al. | |
| 4,441,722 A | 4/1984 | Pichler | |
| 4,451,050 A | 5/1984 | Repella | |
| 4,484,753 A | 11/1984 | Kalsi | |
| 4,531,747 A | 7/1985 | Miura | |
| 4,542,573 A | 9/1985 | Bainard | |
| 4,588,579 A | 5/1986 | Bachhuber et al. | |
| 4,610,319 A | 9/1986 | Kalsi | |
| 4,619,534 A | 10/1986 | Daly et al. | |
| 4,705,277 A | 11/1987 | Repella | |
| 4,726,695 A | 2/1988 | Showalter | |
| 4,729,569 A | 3/1988 | Muller et al. | |
| 4,739,998 A | 4/1988 | Steusloff et al. | |
| 4,750,747 A | 6/1988 | Holzer | |
| 4,770,548 A | 9/1988 | Otto | |
| 4,789,166 A | 12/1988 | Rericha et al. | |
| 5,002,289 A | 3/1991 | Yasui et al. | |
| 5,139,275 A | 8/1992 | Ehrmann et al. | |
| 5,190,299 A | 3/1993 | Johnston | |
| 5,195,754 A | 3/1993 | Dietle | |
| 5,195,757 A | 3/1993 | Dahll | |
| 5,230,520 A | 7/1993 | Dietle et al. | |
| 5,263,404 A * | 11/1993 | Gaucher et al. | 92/168 |
| 5,427,387 A | 6/1995 | Johnston | |
| 5,511,886 A | 4/1996 | Sink | |
| 5,678,829 A | 10/1997 | Kalsi et al. | |
| 5,692,757 A | 12/1997 | Straub | |
| 5,711,534 A | 1/1998 | Bengoa et al. | |
| 5,738,358 A | 4/1998 | Kalsi et al. | |
| 5,791,658 A | 8/1998 | Johnston | |
| 5,795,074 A | 8/1998 | Rahman et al. | |
| 5,829,338 A | 11/1998 | Chrestoff et al. | |
| 5,873,576 A | 2/1999 | Dietle et al. | |
| 5,915,696 A | 6/1999 | Onuma et al. | |
| 5,921,555 A | 7/1999 | Johnston | |
| 6,036,192 A | 3/2000 | Dietle et al. | |
| 6,105,968 A | 8/2000 | Yeh et al. | |
| 6,109,618 A | 8/2000 | Dietle | |
| 6,120,036 A | 9/2000 | Kalsi et al. | |
| 6,139,020 A | 10/2000 | Friend et al. | |
| 6,189,896 B1 | 2/2001 | Dickey et al. | |
| 6,315,302 B1 | 11/2001 | Conroy et al. | |
| 6,334,619 B1 | 1/2002 | Dietle et al. | |
| 6,382,634 B1 | 5/2002 | Dietle et al. | |
| 6,494,462 B2 | 12/2002 | Dietle | |
| 6,561,520 B2 | 5/2003 | Kalsi et al. | |
| 6,685,194 B2 | 2/2004 | Dietle et al. | |
| 6,767,016 B2 | 7/2004 | Gobeli et al. | |
| 7,052,020 B2 | 5/2006 | Gobeli et al. | |
| 2003/0016891 A1 | 1/2003 | Gomyo et al. | |
| 2004/0104536 A1* | 6/2004 | Gobeli et al. | 277/400 |
| 2004/0155054 A1 | 8/2004 | McKitrick | |
| 2005/0093246 A1 | 5/2005 | Dietle | |

* cited by examiner

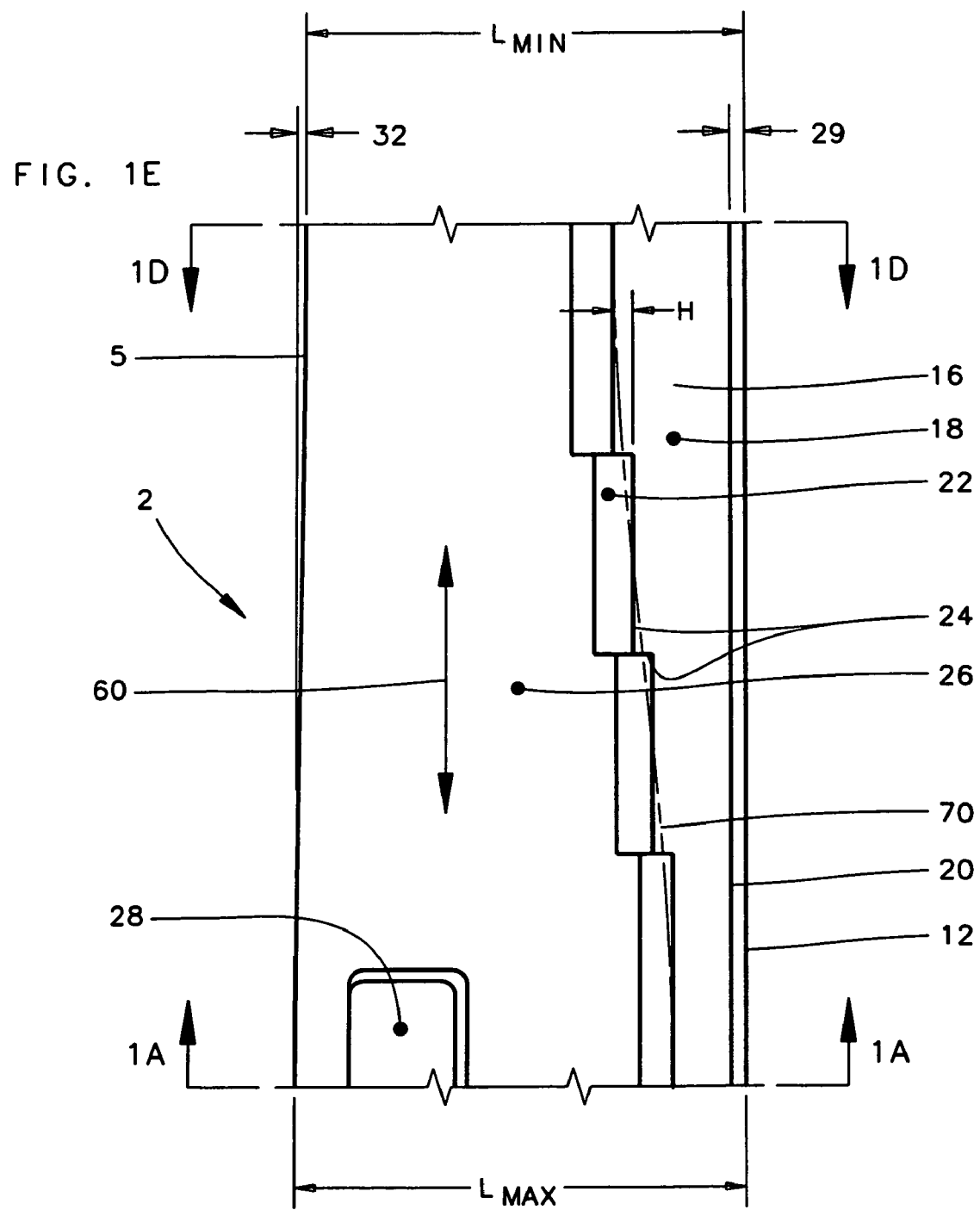

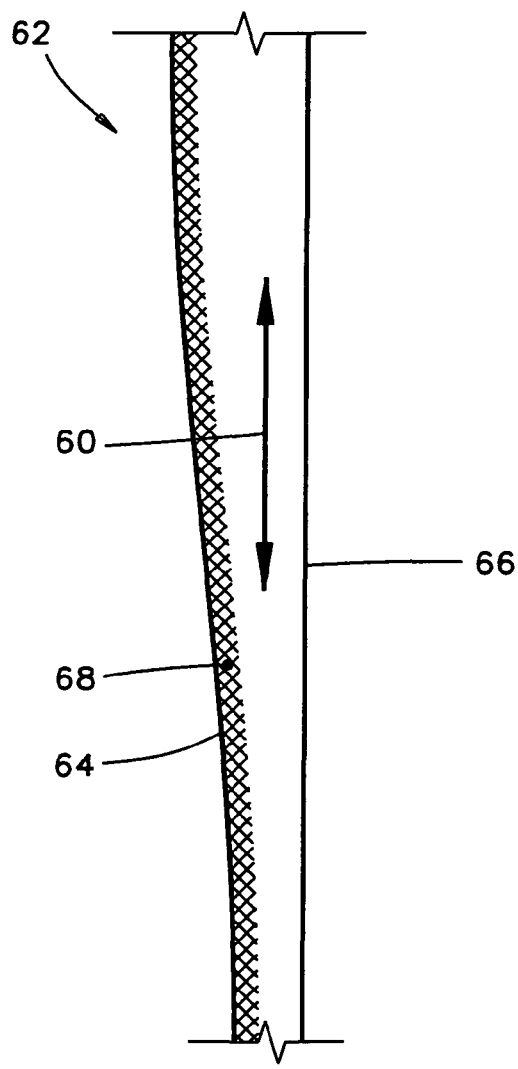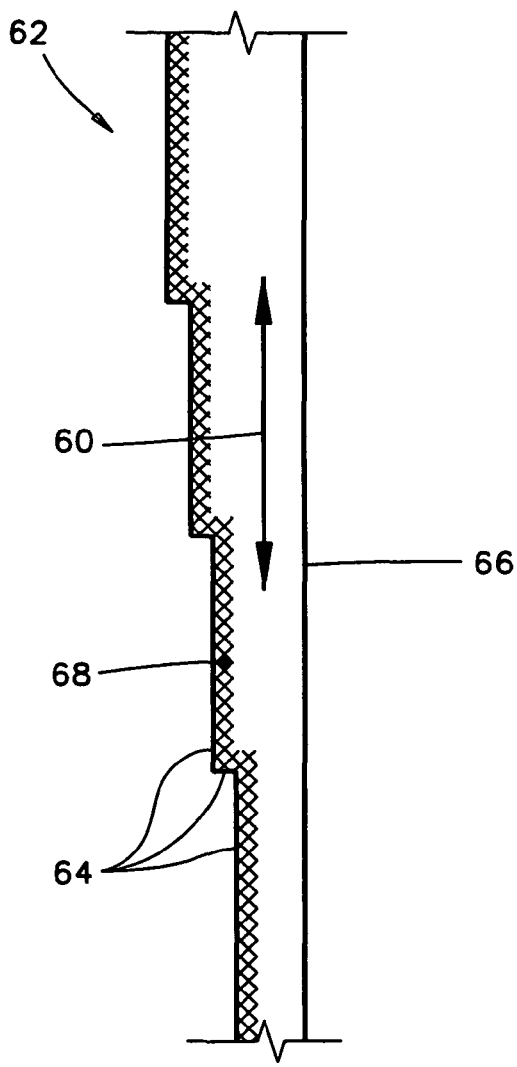

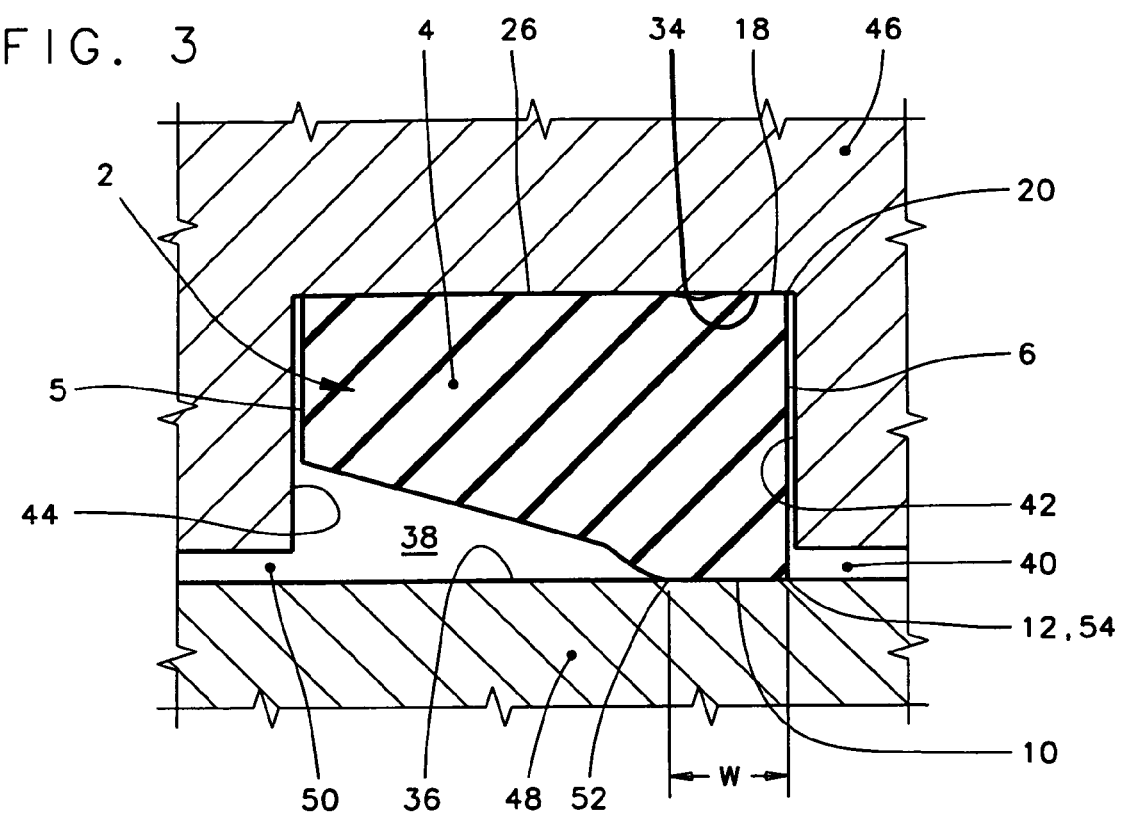
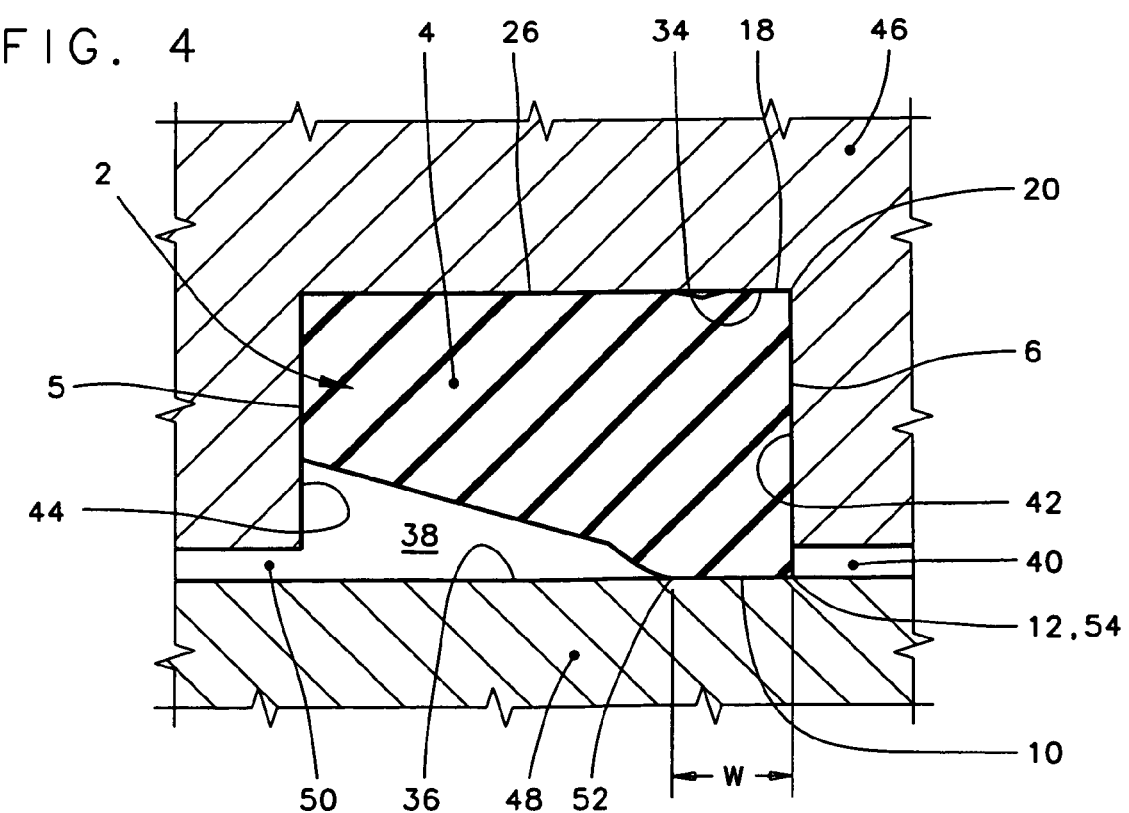

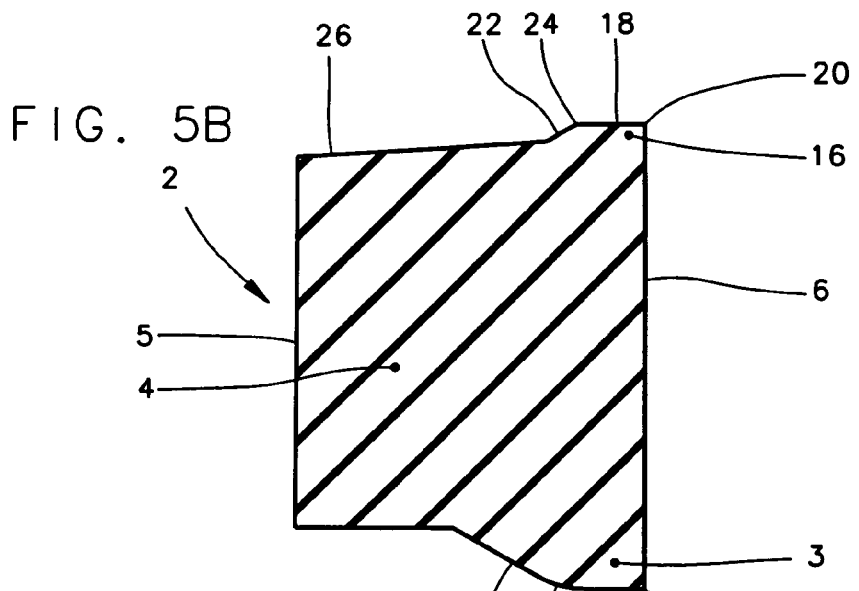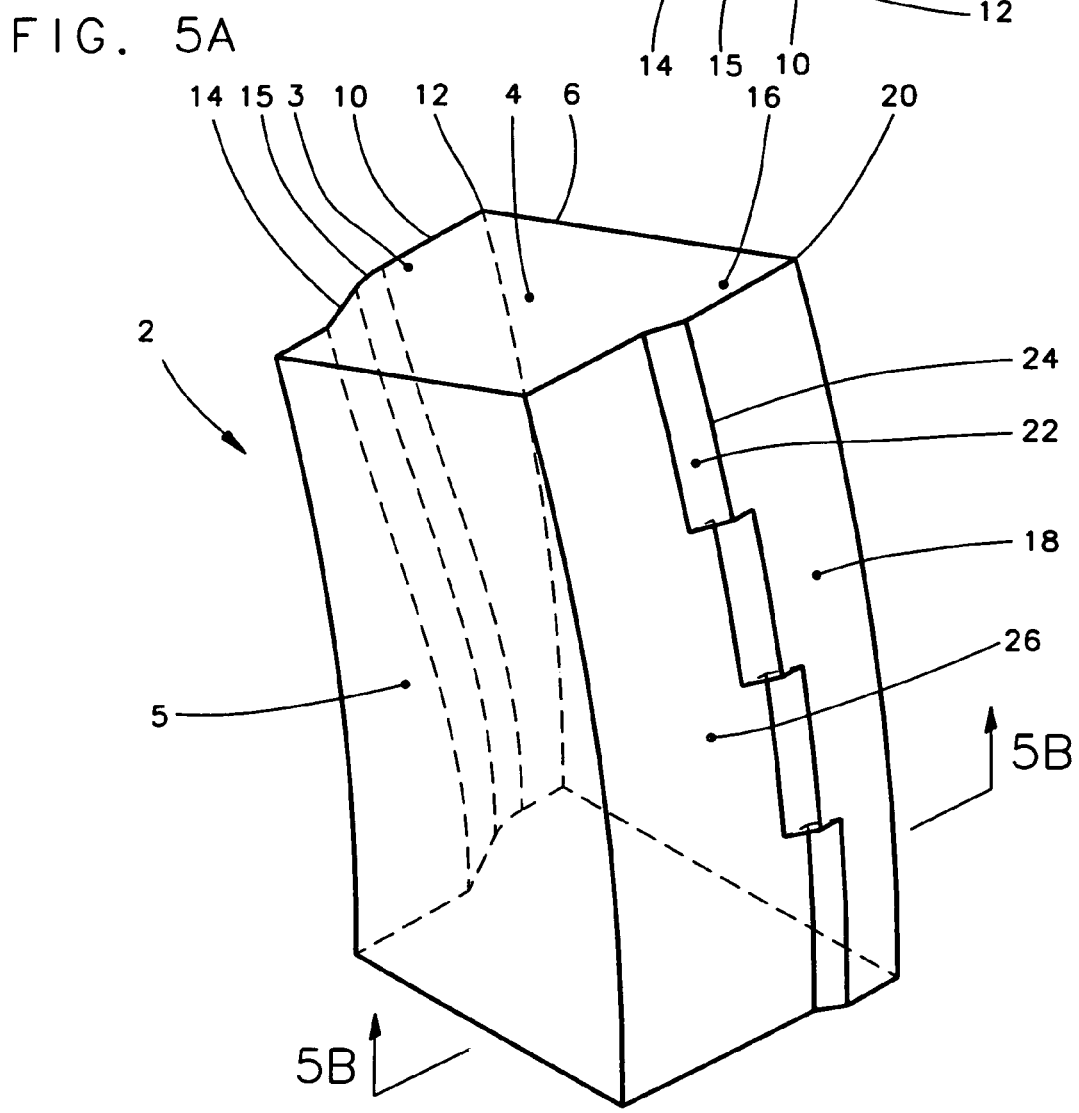

STABILIZING GEOMETRY FOR HYDRODYNAMIC ROTARY SEALS

CROSS-REFERENCE TO RELATED APPLICATIONS

This application claims the benefit of U.S. Provisional Application Ser. No. 60/755,975 filed Jan. 4, 2006, entitled "Hydrodynamic Rotary Seal," and claims the benefit of U.S. Provisional Application Ser. No. 60/851,937 filed Oct. 16, 2006, entitled "Stabilizing Geometry for Hydrodynamic Seals." Provisional Application Ser. Nos. 60/755,975 and 60/851,937 are incorporated by reference herein for all purposes.

STATEMENT REGARDING FEDERALLY SPONSORED RESEARCH OR DEVELOPMENT

This invention was made with United States government support under Contract No. DE-FG02-05ER84206 awarded by the Department of Energy. The United States government therefore has certain rights in this invention.

BACKGROUND OF THE INVENTION

1. Field of Invention

This invention relates to hydrodynamic rotary seals that are used to retain lubricant and exclude the environment in diverse applications. More specifically, this invention relates to features that improve seal cross-sectional stability and exclusion edge circularity in zero and low differential pressure conditions, and conditions of low level reversing differential pressure, and provide improved contact pressure control at the dynamic sealing interface for improved abrasive exclusion, and improved consistency of hydrodynamic lubrication and flushing action.

2. Description of Related Prior Art

The following commonly assigned patent documents are related to the invention, and are incorporated herein by reference for all purposes:

United States Patents:
1. U.S. Pat. No. 7,052,020 Hydrodynamic Rotary Seal
2. U.S. Pat. No. 6,767,016 Hydrodynamic Rotary Seal With Opposed Tapering Seal Lips
3. U.S. Pat. No. 6,685,194 Hydrodynamic Rotary Seal With Varying Slope
4. U.S. Pat. No. 6,561,520 Hydrodynamic Rotary Coupling Seal
5. U.S. Pat. No. 6,494,462 Rotary Seal With Improved Dynamic Interface
6. U.S. Pat. No. 6,382,634 Hydrodynamic Seal With Improved Extrusion Abrasion and Twist Resistance
7. U.S. Pat. No. 6,334,619 Hydrodynamic Packing Assembly
8. U.S. Pat. No. 6,315,302 Skew Resisting Hydrodynamic Seal
9. U.S. Pat. No. 6,227,547 High Pressure Rotary Shaft Sealing Mechanism
10. U.S. Pat. No. 6,120,036 Extrusion Resistant Hydrodynamically Lubricated Rotary Shaft Seal
11. U.S. Pat. No. 6,109,618 Rotary Seal With Enhanced Lubrication and Contaminant Flushing
12. U.S. Pat. No. 6,036,192 Skew and Twist Resistant Hydrodynamic Rotary Shaft Seal
13. U.S. Pat. No. 6,007,105 Swivel Seal Assembly
14. U.S. Pat. No. 5,873,576 Skew and Twist Resistant Hydrodynamic Rotary Shaft Seal
15. U.S. Pat. No. 5,823,541 Rod Seal Cartridge for Progressing Cavity Artificial Lift Pumps
16. U.S. Pat. No. 5,738,358 Extrusion Resistant Hydrodynamically Lubricated Multiple Modulus Rotary Shaft Seal
17. U.S. Pat. No. 5,678,829 Hydrodynamically Lubricated Rotary Shaft Seal With Environmental Side Groove
18. U.S. Pat. No. 5,230,520 Hydrodynamically Lubricated Rotary Shaft Seal Having Twist Resistant Geometry
19. U.S. Pat. No. 5,195,754 Laterally Translating Seal Carrier For a Drilling Mud Motor Sealed Bearing Assembly
20. U.S. Pat. No. 4,610,319 Hydrodynamic Lubricant Seal For Drill Bits United States Patent Applications:
1. Pub. No. 2005/0093246 Rotary Shaft Sealing Assembly
2. Pub. No. 2006/0214379 Composite, High Temperature, Dynamic Seal and Method of Making Same
3. Pub. No. 2006/0214380 Low Torque Hydrodynamic Lip Geometry for Bi-Directional Rotation Seals
4. Ser. No. 11/488,746 Filled Hydrodynamic Seal With Contact Pressure Control, Anti-Rotation Means and Filler Retention Means Kalsi Engineering manufactures various configurations of hydrodynamic seals, based on the above-referenced patents and patent applications, and sells them under the registered trademark "KALSI SEALS." The rotary seals that are marketed by Kalsi Engineering are installed with radial interference (i.e., compression), and seal by blocking the leak path. These well-known seals employ various dynamic lip geometries that cause a lubricant-side edge of a dynamic sealing interfacial contact footprint to be wavy. For example, see FIG. 13 of U.S. Pat. No. 5,230,520, FIG. 2F of U.S. Pat. No. 6,109,618, and FIGS. 2, 2A and 2B of U.S. Patent Application Publication No. 2006/0214380. As a consequence of the wavy lubricant-side footprint edge, the rotary motion of the lubricant-wetted shaft drags lubricant into the dynamic sealing interface, and causes the seal to hydroplane on a film of lubricant that separates the seal from the shaft. This hydrodynamic operating regime allows the seal to operate cooler and with less wear, even under conditions of high differential pressure acting from the lubricant side of the seal. The environment side of the interfacial contact footprint is intended to be circular rather than wavy, to avoid hydrodynamic activity with the environment, and thereby exclude the environment-but in fact the environment side of the footprint is typically quite wavy in prior art non-axially constrained seals that are used in conditions of low or no differential pressure, as described below. In the preceding sentence, the word "circular" is meant to imply that the environment side of the interfacial contact is in theory intended to form a circumference as it is described and understood in plane geometry; i.e. "a closed plane curved line with all of its points equidistant from an interior and coplanar point which is called the center" (Lacret Plane Geometry, March 1982). Although this environment-side circularity is desirable in theory, true perfect theoretical circularity is seldom if ever obtainable in any feature of any manufactured product in actual practice.

Virtually all of the above-noted commercial seals employ the projecting fixed-width annular static sealing lip as shown and described in FIG. 3 of U.S. Pat. No. 5,230,520. This fixed-width static lip provides an approximation of compressive symmetry, and provides a dramatic increase in abrasive exclusion in low differential pressure conditions, compared to the original first-generation seals that were based on U.S. Pat. No. 4,610,319 and did not employ a projecting static lip.

Head-to-head testing of seals with and without such fixed-width projecting static lips was performed, and the abrasive exclusion performance of the seals with the fixed-width static sealing lip were very superior to the first generation seals in low differential pressure conditions. While providing a clear and consistent benefit in low differential pressure conditions, the abrasive exclusion performance of the fixed-width static lip was not consistent in zero differential pressure conditions.

In zero differential pressure conditions in the presence of an abrasive environment, some seals with the fixed width static lip performed well in the laboratory for hundreds of hours, while others lasted only a few hours before third-body abrasion took its toll. This zero differential pressure problem was initially addressed by axially spring loading the seals from the lubricant side to simulate low differential pressure, as shown in FIGS. 3-8 of the Kalsi Seals Handbook, Rev. 1. Later, special purpose seals were developed that employed the seal body as an axial spring, as disclosed in U.S. Pat. No. 6,315,302. These "axially constrained" seals have been very successful in applications where a lubricant must be partitioned from an abrasive environment in conditions of zero differential pressure, or low levels of reversing differential pressure. Such axially constrained seals presently have limitations in terms of their ability to handle high differential pressure acting from the lubricant side. Also, it has been noted that the exclusion edge chamfer of such axially constrained seal is subject to flattening in high differential pressure conditions.

A seal is needed that is capable of handling high differential pressure, while offering good abrasion resistance in conditions of periodic zero differential pressure conditions.

Rotary seals with smaller radial cross-sections, to fit smaller radial groove depths, are desirable in oilfield mud motor sealed bearing assemblies. The smaller radial groove depth means that for any given size of motor, the wall thickness of the shaft and housing can be increased, for improved strength. This is particularly important in miniature mud motor sealed bearing assemblies.

For the same amount of radial dimensional compression, the percentage of compression of a small seal cross-section is greater than that of a larger seal cross-section, which means that interfacial contact pressure increases as the seal cross-sectional size decreases. For example, a nominal radial dimensional compression of 0.030" results in 10% nominal compression with a 0.30" deep seal cross-section, and results in 20% nominal compression with a 0.15" deep radial seal cross-section. Since in general terms, the interfacial contact pressure is related to the percentage of compression times the modulus of elasticity of the seal material, the smaller cross-section seal has significantly higher interfacial contact pressure than the larger cross-section seal. This increased interfacial contact pressure can make the small cross-section seal more difficult to lubricate.

For the same amount of radial dimensional compression, smaller diameter seals experience a higher percentage of circumferential compression than larger diameter seals, and this effect also increases the interfacial contact pressure of smaller diameter seals.

In summary, interfacial contact pressure increases as a function of decreasing the seal cross-section and/or decreasing the seal diameter. This increasing contact pressure effect associated with small seal cross-sections and diameters is magnified by the exclusion edge chamfer used on existing commercial axially constrained seals. The use of an exclusion edge chamfer to manage interfacial contact pressure near the exclusion edge of the seal therefore becomes less practical as the cross-sectional size and/or diameter of an axially constrained seal is miniaturized. An alternate method of controlling interfacial contact pressure near the exclusion edge is desirable for axially constrained seals having a small cross-section and/or diameter.

The fixed-width projecting static lip was originally designed using finite element analysis, at a time when the available analytical tools (e.g. software and computers) were relatively primitive. Element choice was limited, and less than ideal. Mesh size was limited by computer processing power, and run-times were extremely long, even with two dimensional axi-symmetric models. The insights gained were sufficient to realize improved seal performance through the use of the fixed-width projecting static lip, but subtleties were masked by the limited analysis technology of the period.

Dramatic computer and software advances now permit three dimensional finite element analysis with advanced element types using highly refined meshes that provide a more detailed understanding of seal performance. This analysis reveals that in non-axially constrained seals exposed to zero differential pressure conditions, the fixed-width static lip only provides optimum cross-sectional stability near the average width of the dynamic lip. At some circumferential locations, the static lip twists away from the environment and causes the exclusion edge to lift away from the shaft in a wavy pattern at a low angle of convergence that is responsible for wedging the abrasive environment into the dynamic sealing interface. This undesirable seal attitude in zero-differential pressure conditions has been noted both with single modulus seals constructed in accordance with U.S. Pat. No. 5,230,520, and with dual modulus seals constructed in accordance with U.S. Pat. No. 5,738,358.

The changing cross-sectional twist between the narrowest and widest portions of the dynamic lip cause the seal to be significantly non-circular in zero differential pressure conditions, pre-disposing it to significant skewing as a result of circumferential compression and circumferential differential thermal expansion between the seal and the seal gland, resulting in skew-induced abrasive ingestion.

Finite element analysis shows that these undesirable seal characteristics are rectified by axial spring loading from the lubricant side of the seal, or by employing low differential pressure from the lubricant side, thus helping to explain performance observed in the laboratory. Seal to gland friction is present in real world conditions. Sometimes the friction is sufficient to retain the seal in a suitable orientation for abrasive exclusion, and sometimes it is not, resulting in wide variations in abrasive exclusion that have been observed from test to test in zero differential pressure conditions.

The fixed-width static lip of Kalsi Engineering's "High Film" seal, disclosed in U.S. Pat. No. 6,109,618, was initially developed intuitively since, at the time it was developed, suitably efficient three dimensional modeling and analysis techniques were not available. The resulting seals had wide variations in hydrodynamic flushing action, even in conditions of differential pressure acting from the lubricant side. For example, if a seal was tested and then disassembled for observation, then reinstalled and retested, it might have dramatically different lubricant flushing in the first and second portions of the test. This problem was ultimately rectified by experimentally increasing the width of the static lip. This experimental work provided the new insight that the width of the static lip plays a definite role in lubricating and flushing efficiency and consistency by providing improved uniformity in contact pressure near the lubricant side of the interfacial contact footprint. Unfortunately, the static lip fixed-width that provides the best uniformity in trailing edge contact pressure from one assembly to another is different than the static lip width that provides the best condition of average compressive symmetry over the varying width of the dynamic sealing interface for achieving abrasive exclusion.

Seals have been proposed that have opposed hydrodynamic lips (see, for example, FIGS. 8 and 8A in U.S. Pat. No. 6,685,194), where the seal is allowed to slip rotationally with respect to both the shaft and the gland. In such seals, good compressive symmetry could be achieved at every circumferential location for improved exclusion edge contact pressure and circularity. Such seals are not appropriate for conditions of high differential pressure, because if a rotary seal is allowed to slip very much with respect to the extrusion gap, the sharp extrusion gap corner of the gland can cut the seal and cause it to fail prematurely, especially if any corner defects are present. While seals that have opposed hydrodynamic lips may be suitable for zero differential pressure or low levels of reversing differential pressure, they are not considered suitable for high differential pressure service.

Slippage of the seal within the housing gland can also occur with seals that have a fixed-width static lip. This occurs more often in low differential pressure service with large diameter seals because the moment arms between the static and dynamic interfaces are more nearly equal. Slippage of seals with fixed-width static lips has also been observed in high differential pressure service, when the seal is exposed to reversing pressure differential. Rotational slippage is particularly undesirable in large diameter seals. The slippage can vary around the circumference of a large seal, causing undesirable localized circumferential stretching. Slippage is exacerbated by wear of the dynamic lip and/or the mating shaft surface, because such wear causes an increase in seal running torque.

Seals having anti-rotation projections molded into the lubricant end of the seal to engage recesses in the lubricant-side gland wall are disclosed in U.S. Application Pub. No. 2005/0093246 A1. Such seals are suitable for conditions of constant differential pressure from the lubricant side, or zero differential pressure. Such seals are not suitable for differential pressure acting from the environment side, because even low differential pressure from the environment side causes the seal to bow into the mating recesses in the lubricant-side gland wall, resulting in skewing of the exclusion edge of the seal, which promotes skew-induced environmental abrasion of the seal.

It has recently been observed by the inventors that with seals having a variable dimension dynamic lip, the length of the compressed seal varies as the width of the dynamic lip varies around the circumference of the seal. The compressed seal body is longest near the widest part of the dynamic lip, and is shortest near the narrowest part of the dynamic lip. This means that if the seal is forced substantially flat against the lubricant side gland wall by differential pressure acting from the environment side, the environment end of the seal will become wavy owing to the compressed length variations of the seal body. This environment end waviness has negative implications in terms of environmental exclusion, because it promotes environmental abrasion of the seal.

It is desirable to be able to overcome the shortcomings described above. A seal is needed that is suitable for high differential pressure acting from the lubricant side, while offering improved abrasion resistance performance in the periodic conditions of zero differential pressure or low levels of reversing pressure that are common to many abrasive environment applications.

BRIEF SUMMARY OF THE INVENTION

The present invention is a rotary seal which overcomes the above-described shortcomings. The preferred embodiment of the invention includes several desirable features which may be used together, or separately. The invention relates generally to rotary seals for establishing sealing between relatively rotatable machine components for lubricant retention and environment exclusion, where seal geometry interacts with the lubricant during relative rotation to wedge a film of lubricant into the dynamic sealing interface between the seal and the relatively rotatable surface.

The preferred embodiment of the invention is a generally circular, hydrodynamically lubricating rotary seal which (1) exploits seal cross-sectional twisting to manage interfacial contact pressure near the environment side edge of the dynamic sealing interface, (2) has a variable dimension static lip for compressive symmetry, and (3) preferably has uniquely oriented anti-rotation tangs or recesses to prevent rotational slippage while still being compatible with reversing differential pressure.

One embodiment of the present invention includes a hydrodynamic seal having a seal body of generally ring-shaped configuration having a circumference, a hydrodynamic sealing lip, and a static sealing lip having a cross-sectional area and/or a width that varies about the circumference.

Another embodiment of the hydrodynamic sealing assembly of the present invention includes a first machine component having first and second walls and a peripheral wall defining a seal groove, a second machine component having a relatively rotatable surface relative to the first machine component, and a hydrodynamic seal comprising a seal body of generally ring-shaped configuration having a circumference. The seal body includes a hydrodynamic sealing lip contacting the relatively rotatable surface and a static sealing lip contacting the peripheral wall. The static sealing lip has a cross-sectional area and/or a width that varies about the circumference.

Another embodiment of the hydrodynamic sealing assembly of the present invention includes a first machine component having first and second walls and a peripheral wall defining a seal groove, a second machine component having a relatively rotatable surface relative to the first machine component, and a hydrodynamic seal comprising a seal body of generally ring-shaped configuration having a circumference. The seal body includes a hydrodynamic sealing lip contacting the relatively rotatable surface, a static sealing lip of annular form having a static sealing surface contacting the peripheral wall, and a twist-limiting surface generally facing the peripheral wall. The twist-limiting surface is angulated relative to the peripheral wall in an uninstalled condition and limits the twist of the seal body in an installed condition.

Another embodiment of the hydrodynamic sealing assembly of the present invention includes a first machine component having first and second walls and a peripheral wall defining a seal groove, a second machine component having a relatively rotatable surface that is rotatable relative to the first machine component, and a hydrodynamic seal comprising a seal body of generally ring-shaped configuration having a circumference. The seal body includes a hydrodynamic sealing lip contacting the relatively rotatable surface, a static sealing lip of annular form having a static sealing surface contacting the peripheral wall, and a twist-limiting surface generally facing the peripheral wall. The twist-limiting surface is interrupted by an anti-rotation discontinuity and the first machine component includes a mating discontinuity. The discontinuities mate to prevent rotation of the seal body relative to the first machine component.

It is intended that the rotary seals of the present invention may incorporate one or more seal materials without departing from the spirit or scope of the invention, and may be composed of any suitable sealing material, including elastomeric or rubber-like materials which may if desired be combined with various plastic materials such as reinforced polytetrafluoroethylene ("PTFE") based plastic. If desired, the rotary seals may be of monolithic integral, one piece construction or may also incorporate different materials bonded or otherwise joined together to form a composite structure.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments which vary only in specific detail.

In the drawings:

FIG. 1E is a fragmentary view representing the uncompressed configuration of a portion of an alternate embodiment of the ring-shaped hydrodynamic seal embodying the principles of the present invention, the view being representative of a hydrodynamic seal of infinite or near infinite diameter so that the effects of curvature-related foreshortening can be ignored;

FIG. 1F is a fragmentary view representing the shape of a static sealing interfacial contact footprint established between a static sealing lip of the hydrodynamic seal of FIG. 1C and the first machine component of FIG. 1B;

FIG. 1G is a fragmentary view representing the shape of a static sealing interfacial contact footprint established between a static sealing lip of the hydrodynamic seal of FIG. 1E and the first machine component of FIG. 1B;

FIGS. 3 and 4 are fragmentary cross-sectional views representing the compressed cross-sectional configuration of other embodiments of the ring-shaped hydrodynamic seal according to the present invention, the hydrodynamic seal being shown in the compressed cross-sectional configuration in conjunction with first and second machine components;

FIG. 5A is a fragmentary perspective view representing the uncompressed configuration of another embodiment of the ring-shaped hydrodynamic seal according to the present invention;

FIG. 5B is a fragmentary cross-sectional view taken at cutting plane 5B-5B of FIG. 5A representing the uncompressed cross-sectional configuration of the hydrodynamic seal;

DESCRIPTION OF THE PREFERRED EMBODIMENTS

Figure 1A:
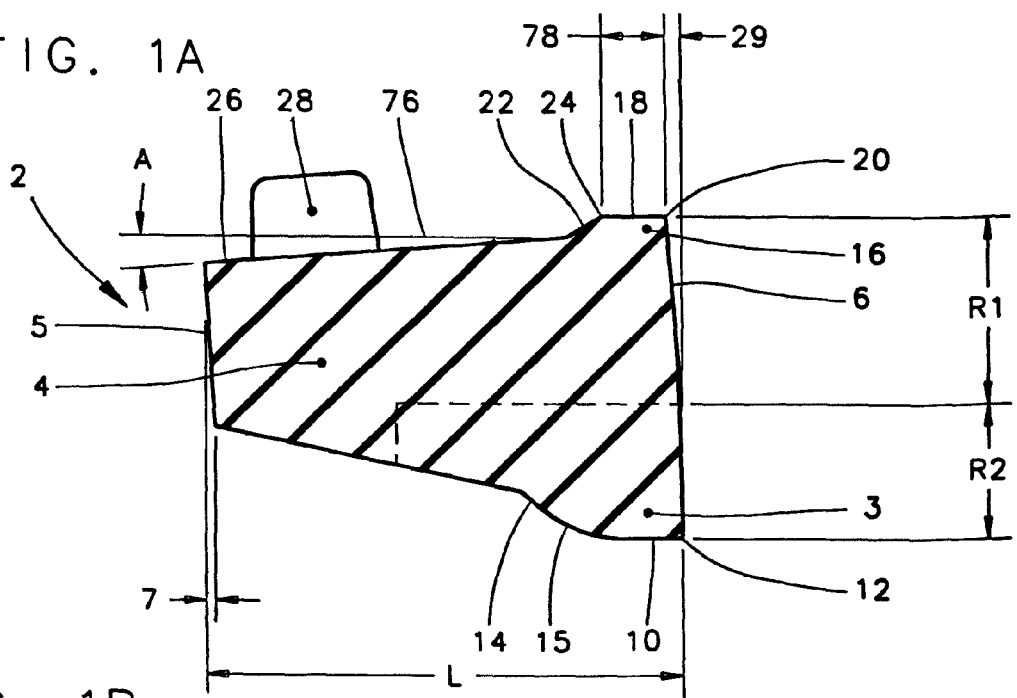
FIG. 1A is a fragmentary cross-sectional view taken at cutting plane 1A-1A of FIGS. 1C and 1E representing the uncompressed cross-sectional configuration of a ring-shaped hydrodynamic seal embodying the principles of the present invention.

The rotary seal according to the preferred embodiments of the present invention is generally referred to as reference number 2 in the drawings.

FIGS. 1A-1D

FIGS. 1A-1D are views representing a preferred embodiment of the present invention, and should be studied together, in order to attain a more complete understanding of the invention. Features throughout this specification that are represented by like numbers have the same basic function.

Figure 1B:
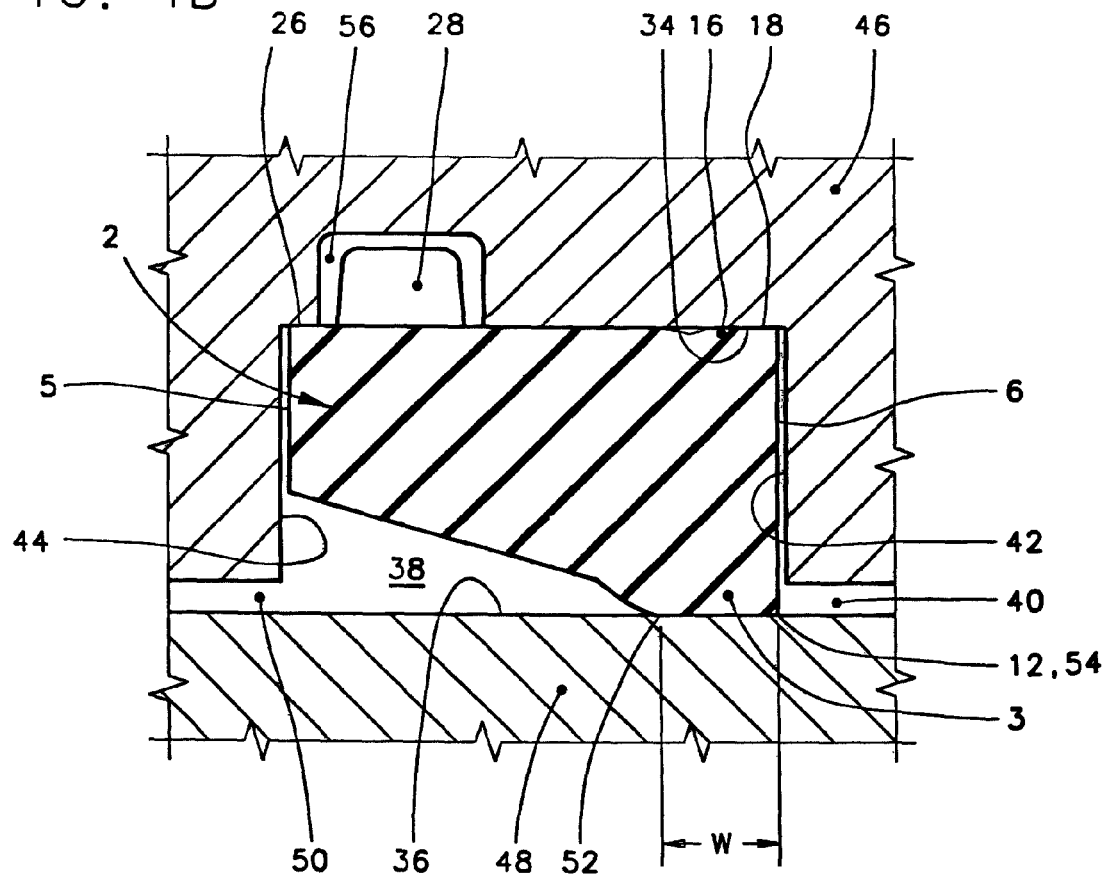
FIG. 1B is a fragmentary cross-sectional view of the hydrodynamic seal of FIG. 1A showing the compressed cross-sectional configuration in conjunction with first and second machine components.

FIG. 1A is a fragmentary view that represents the cross-sectional configuration of the seal before installation, and FIG. 1B is a fragmentary view that represents the cross-sectional configuration of the seal when installed. For orientation purposes, it should be understood that in the views of FIGS. 1A and 1B, the cutting plane of the cross-section is aligned with and passes through the theoretical axis of the seal.

In FIG. 1A, the rotary seal 2 of the present invention is shown in an uncompressed configuration. The rotary seal 2 has a ring-like seal body 4 of generally circular configuration. The rotary seal 2 includes a hydrodynamic sealing lip 3 and a static sealing lip 16. Seal body 4 has a first end 5 and a second end 6. Seal body 4, being a generally circular, ring-like entity, defines a theoretical centerline/axis (not shown), and a median circumference (hereafter "circumference").

Rotary seal 2 is constructed of sealing material, preferably an elastomer or a combination of one or more elastomers, or a combination of a suitable plastic and an elastomer. The potential material arrangements of rotary seal 2 can be discussed by referring to two separate material regions R1 and R2 shown in FIG. 1A by dashed lines. Region R1 preferably encompasses at least part of static sealing lip 16, and Region R2 preferably encompasses at least part of hydrodynamic sealing lip 3. Regions R1 and R2 can be comprised of the same material, or comprised of differing material, as taught by the commonly assigned prior art patents noted above. For example, Region R1 can be comprised of a sealing material having a modulus of elasticity that may be identical or different than the modulus of elasticity of Region R2, and the material type may be the same or different in Regions R1 and R2. If the material type and modulus of elasticity are the same in Regions R1 and R2, the seal would be a single material, monolithic, homogeneous seal. For another example, Region R1 could be an elastomer having a higher compression set resistance than the elastomer forming Region R2, yet both elastomers could have substantially the same modulus of elasticity, as taught by commonly assigned U.S. Application Pub. No. 2006/0214379. For another example, the modulus of elasticity of Region R1 could be lower than the modulus of elasticity of Region R2 to minimize the magnitude of interfacial contact pressure while improving high pressure extrusion resistance, as taught by commonly assigned U.S. Pat. No. 5,738,358. In such a case, Region R1 would be an elastomer and Region R2 would be a harder elastomer or plastic. A typical example of a candidate plastic would be carbon-graphite reinforced PTFE. As used herein, the "modulus" or "elastic modulus" of an elastomer can be estimated in accordance with FIG. 1 of ASTM D 1415-83, Standard Test Method For Rubber Property—International Hardness.

It is understood that elastomers used in seal construction are compounds that include base elastomers (such as, but not limited to HNBR (highly saturated nitrile elastomer), FKM (fluorocarbon rubber), TFE/P (Tetrafluoroethylene and Propylene Copolymer) and EPDM), and may include other compounding agents including fillers, processing aids, anti-degradants, vulcanizing agents, accelerators and activators. The effects of the ingredients used are generally understood by those of ordinary skill in the art of compounding elastomers. Likewise, the ingredients used in manufacturing plastics that are used in seal construction are generally understood by those of ordinary skill in the art of developing plastic seal materials.

The hydrodynamic sealing lip 3 projects from the seal body 4. Hydrodynamic sealing lip 3 varies in dimension (e.g. at least one of its dimensions varies) about the circumference of seal body 4, in accordance with the teachings of the commonly assigned patents and patent applications noted above, to produce a dynamic interface of variable width when installed and to cause hydrodynamic wedging activity in response to relative rotation.

Prior Kalsi Engineering patents and publications teach that almost any dimension of the hydrodynamic sealing lip 3 can be varied in dimension to produce a dynamic interface of variable width when installed, and to cause hydrodynamic wedging activity in response to relative rotation when installed. For example, U.S. Pat. No. 4,610,319 teaches that the width of the dynamic lip can be varied to achieve the desired results, U.S. Pat. No. 6,685,194 teaches that the slope and/or curvature of the dynamic lip and/or depth of the seal can be varied to produce the desired results, and U.S. Pat. No. 6,109,618 and U.S. Application Pub. No. 2006/0214380 show that the overall surface profile dimensions can be varied in complex ways to achieve the desired results.

When pressed against a relatively rotatable surface, the hydrodynamic sealing lip 3 establishes an interfacial contact footprint with respect to the relatively rotatable surface that has a non-circular, wavy lubricant-side edge and a substantially circular environment-side edge, in accordance with the above-noted commonly assigned patents and patent applications. Examples of such footprints can be seen in FIGS. 2-8 of U.S. Pat. No. 4,610,319, FIG. 13 of U.S. Pat. No. 5,230,520, FIG. 2F of U.S. Pat. No. 6,109,618, and FIGS. 2 and 2A-2C of U.S. Application Pub. No. 2006/0214380.

The hydrodynamic sealing lip 3 incorporates a dynamic sealing surface 10. The cross-sectional profile of dynamic sealing surface 10 can be any suitable shape, including straight or curved lines or line combinations, and shapes that vary around the circumference of seal body 4, as taught by the commonly assigned prior art referenced above. The hydrodynamic sealing lip 3 also incorporates a dynamic exclusionary intersection 12 that is preferably generally circular. If desired, the dynamic exclusionary intersection 12 can be formed by an intersection between the second end 6 and the dynamic sealing surface 10, as shown. The hydrodynamic sealing lip 3 preferably has a lubricant side flank 14 that is non-circular, in accordance with the teachings of the commonly assigned patents and patent applications noted above. The lubricant side flank 14 is preferably blended to the dynamic sealing surface 10 by a blending feature 15 over at least part of the circumference of seal body 4. This blending feature 15, as taught by the commonly assigned prior art, can take many different forms, including forms that vary in shape about the circumference of seal body 4.

A static sealing lip 16 projects from the seal body 4 in substantially opposed relation to the hydrodynamic sealing lip 3. The width 78 of the static sealing lip 16 preferably varies in dimension about the circumference of seal body 4, approximately in time with the variance of the dimension or dimensions of the hydrodynamic sealing lip 3, to provide improved compressive symmetry between the static and dynamic sealing lips, as compared to the prior art.

The static sealing lip 16 incorporates a static sealing surface 18 and preferably incorporates a static exclusionary intersection 20 that is generally circular. If desired, the static exclusionary intersection 20 can be formed by an intersection between the second end 6 and the static sealing surface 18, as shown. The specific shape of the static sealing lip 16 can vary from the shape that is shown without departing from the spirit or scope of the invention. Preferably, the static sealing lip 16 varies dimensionally about the circumference of seal body 4 in combination with geometry (static lip corner 24 and/or anti-rotation discontinuities 28) that prevents lubrication of the static sealing interface between the static sealing lip 16 and the first machine component 46.

The static sealing lip 16 preferably has a static lip flank 22 that is non-circular, and preferably varies in position relative to the second end 6 about the circumference of seal body 4. Preferably, the static lip flank 22 intersects the static sealing surface 18 to form a static lip corner 24. When installed in a compressed condition, the static lip corner 24 produces a local contact pressure zone or spike 68 in the static sealing interface (See FIGS. 1F and 1G), which inhibits hydrodynamic lubrication of the static sealing surface 18 in response to relative motion, and therefore helps to prevent slippage of the rotary seal 2 when installed.

The seal body 4 incorporates a twist-limiting surface 26 that in the uninstalled condition is preferably angulated with respect to peripheral wall 34. For example, if rotary seal 2 were configured for sealing radially against a relatively rotatable surface 36 of external cylindrical form, such as the outer surface of a shaft or sleeve, and for sealing against a peripheral wall 34 of internal cylindrical form, the end of the twist-limiting surface 26 near the first end 5 of the seal body 4 would be smaller in diameter than the end of twist-limiting surface 26 near the static sealing lip 16. Another way of stating it is that the circumference of the twist-limiting surface near the seal first end 5 is smaller than the circumference near the static sealing lip 16. For the sake of illustration, the angulation of twist-limiting surface 26 in the uninstalled condition is represented by angle A in FIG. 1A, where dimensional extension line 76 is parallel to peripheral wall 34 (in FIG. 1B). By being angulated, the twist-limiting surface 26 allows the seal body 4 to twist slightly when installed, to increase contact pressure in the dynamic sealing interface near the dynamic exclusionary intersection 12. In being angulated, twist-limiting surface 26 can be conical, or can as an additional optimization be wavy, in time with the dimensional variation of the hydrodynamic sealing lip 3, to obtain a further improvement in installed circularity (i.e., less waviness) of the seal body 4 in general, and the second end 6 and the dynamic exclusionary intersection 12 in particular. In other words, angle A can be constant around the circumference of the seal such that twist-limiting surface 26 is conical, or as an optimization, angle A can vary around the circumference of the seal such that twist-limiting surface 26 is a wavy angulated surface. The static exclusionary intersection 20 is preferably offset from the dynamic exclusionary intersection 12 by offset dimension 29, resulting in angulation of the second end 6 in the uninstalled condition. During installation, as the seal body 4 twists to increase interfacial contact pressure near the dynamic exclusionary intersection 12, the second end 6 also twists by a commensurate amount. As viewed in FIG. 1A, the aforementioned twisting of the seal body 4 that occurs as a result of compression during installation would be in a clockwise direction.

Since (as described in conjunction with the prior art) perfect theoretical circularity is seldom if ever obtainable in any feature of any manufactured product in practice, it is to be understood that when "circular," "substantially circular," or "substantial circularity," or similar terms are used to describe achievements or feature attributes of the invention that is described and claimed herein, what is meant is that circularity is improved, so that there is less waviness or other deviation from perfect theoretical circularity, compared to the prior art under similar installed conditions. For example, it is one objective of the current invention to improve the circularity (i.e., achieve less waviness) of the environment side of the interfacial contact footprint in conditions of little or no differential pressure compared to the prior art, and this objective is not to be misconstrued as an intent to achieve the unobtainable; i.e., perfect theoretical circularity.

For another example, when improved circularity is discussed in reference to a surface, it means that the surface is less wavy than in the prior art, so that a circumferentially oriented line element drawn on the surface has less deviation from perfect theoretical circularity, compared to the prior art under similar installed conditions.

Figure 1D:
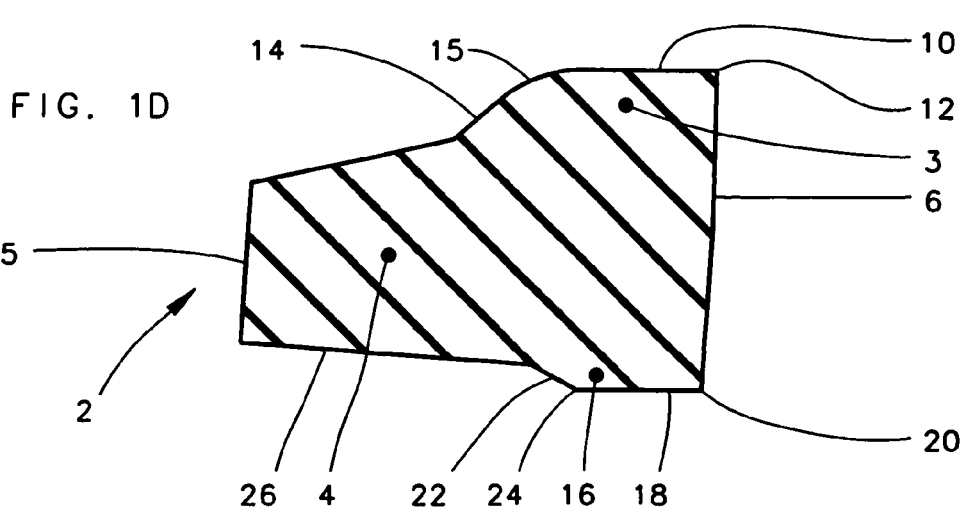
FIG. 1D is a fragmentary cross-sectional view taken at cutting plane 1D-1D of FIGS. 1C and 1E representing the uncompressed cross-sectional configuration of the hydrodynamic seal.
Figure 1C:
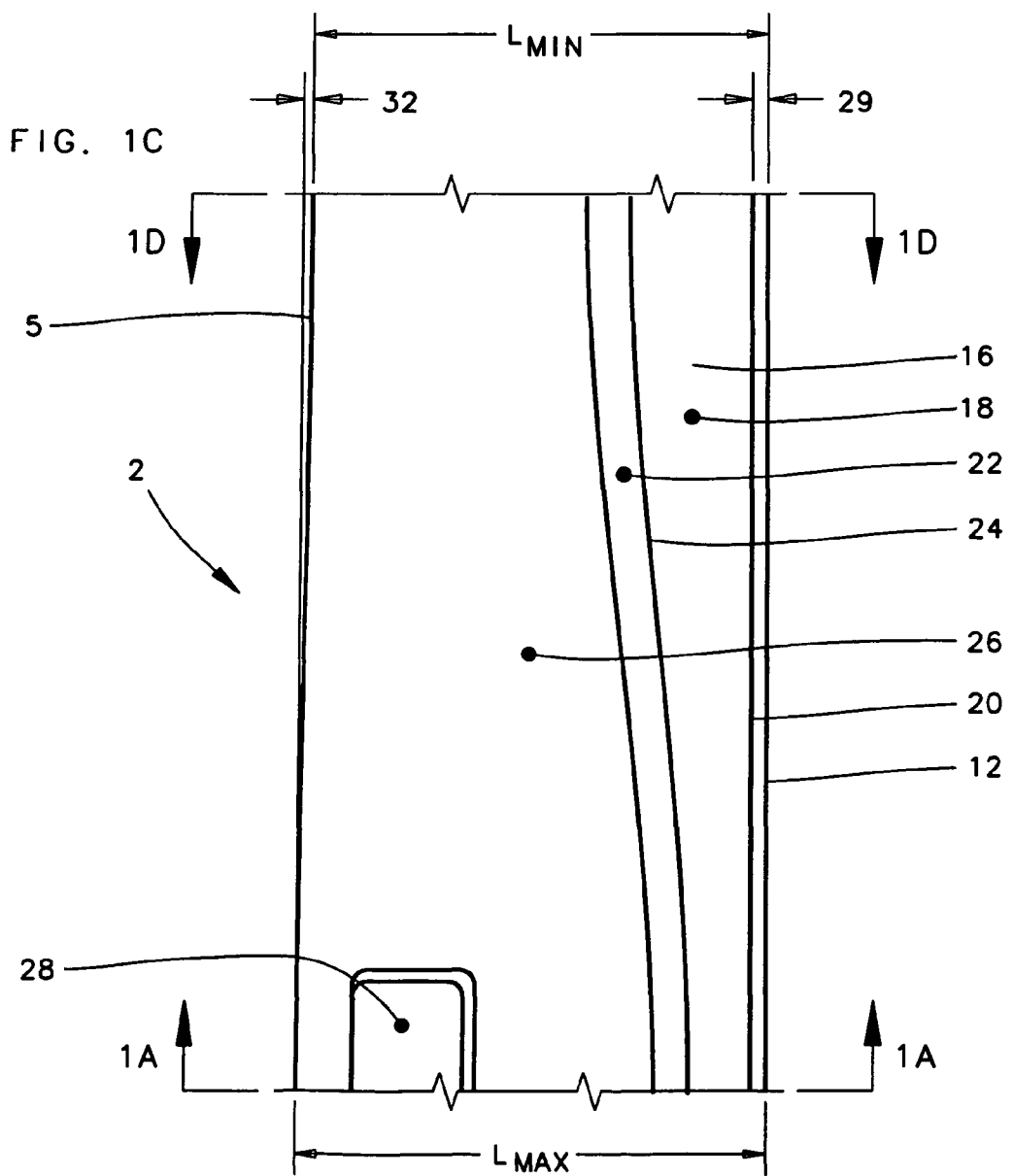
FIG. 1C is a fragmentary view representing the uncompressed configuration of a portion of a ring-shaped hydrodynamic seal embodying the principles of the present invention, the view being representative of a hydrodynamic seal of infinite or near infinite diameter so that the effects of curvature-related foreshortening can be ignored.

Preferably, a plurality of anti-rotation discontinuities 28 are incorporated. In FIGS. 1A-1C, the anti-rotation discontinuities 28 are illustrated as projections from seal body 4, but the anti-rotation discontinuities 28 can be produced in other specific form without departing from the spirit of the invention. The anti-rotation discontinuities 28 in FIGS. 1A and 1B are intended to be interpreted by the standard conventions of multi and sectional view orthographic drawing projection practiced in the United States and described in ANSI Y14.3-1975, an Industry Standardization Document promulgated by ASME. The anti-rotation discontinuities 28 are therefore drawn in outline form without cross-hatch lines to avoid conveying a false impression of circumferential solidity.

The first end 5 of the seal body 4 is preferably angulated as shown in FIG. 1A, tilting by tilt dimension 7. In the uninstalled condition, the length L of seal body 4 preferably varies in length about the circumference of seal body 4 in time with the aforementioned variation in dimension or dimensions of the hydrodynamic sealing lip 3 and the static sealing lip 16. Length L of seal body 4 is greatest where the dimensions of the hydrodynamic sealing lip 3 and the static sealing lip 16 are the smallest, and the length L of seal body 4 is smallest where the dimensions of the hydrodynamic sealing lip 3 and the static sealing lip 16 are the greatest. The longest portion of the seal body 4 is preferably aligned with the smallest portion of the hydrodynamic sealing lip 3 and with the smallest portion of the static sealing lip 16. The length variation of the seal body 4 is provided to compensate for the fact that compression of the rotary seal 2 during installation causes a greater increase in the length L of the seal body 4 at the locations corresponding to the largest portions of the hydrodynamic sealing lip 3 and the static sealing lip 16. Although when in the uninstalled condition, the length L of the seal body 4 varies, when rotary seal 2 is installed, the length of the seal body 4 becomes more uniform. In other words, the first end 5 is intentionally wavy in the uncompressed condition of the seal 2, and becomes approximately circular, or at least less wavy, in the installed condition.

Referring now to FIG. 1B, the rotary seal 2 is shown in its installed condition. The cross-section of FIG. 1B is a fragmentary longitudinal cross-sectional illustration taken at a cutting plane that passes through that theoretical centerline; i.e., the theoretical centerline lies on the cutting plane. The circumferential direction of relative rotation is normal (perpendicular) to the plane of the cross-section, and the theoretical centerline of rotary seal 2 generally coincides with the axis of relative rotation.

Rotary seal 2 is oriented (i.e., positioned) by the first machine component 46 for sealing with respect to a second machine component 48. For the purpose of illustrating a typical application, the first machine component 46 is illustrated as having a generally circular seal groove that is defined by a first wall 44, a second wall 42 and a peripheral wall 34. The first wall 44 and the second wall 42 are in generally opposed relation to one another. Within the seal industry, the first wall 44 is sometimes referred to as the "lubricant-side wall," and the second wall 42 is sometimes referred to as the "environment-side wall."

Although the first wall 44 and the second wall 42 are shown to be in fixed, permanent relation to one another, such is not intended to limit the scope of the invention, for the manner of positioning the rotary seal 2 admits to other equally suitable forms. For example, the first wall 44 and/or the second wall 42 could be configured to be detachable from the first machine component 46 for ease of maintenance and repair, but then assembled in more or less fixed location for locating the rotary seal 2. For another example, it is common in some types of equipment for the first wall 44 to be a ring that is spring-loaded to force the rotary seal 2 into contact with the second wall 42. For yet another example, a detachable gland wall may be mandated when the rotary seal 2 is small in diameter, because such small seals cannot be deformed sufficiently to be installed within a groove that has fixed, non-detachable gland walls.

The first end 5 of rotary seal 2 generally faces the first wall 44, and the second end 6 of rotary seal 2 generally faces the second wall 42. The first end 5 of rotary seal 2 is located in generally opposed relation to the second end 6. Within the seal industry, the first end 5 of rotary seal 2 is sometimes referred to as the "lubricant end," and the second end 6 is sometimes referred to as the "environment end."

First machine component 46 and second machine component 48 together typically define at least a portion of a chamber 50 for locating a first fluid 38 and for defining a lubricant supply. The first fluid 38 is exploited in this invention to lubricate the dynamic sealing interface between rotary seal 2 and the second machine component 48 during relative rotation thereof. First fluid 38 is preferably a liquid-type lubricant such as a synthetic or natural oil, although other fluids including greases, water, and various process fluids are also suitable in some applications. A second fluid 40 may be any type of fluid that rotary seal 2 may be exposed to in service, such as any type of liquid or gaseous environment including, but not limited to, a lubricating media, a process media, seawater, a drilling fluid, a partial vacuum, etc. For purposes of this specification, the term fluid has its broadest meaning, encompassing both liquids and gases.

The dynamic exclusionary intersection 12 of hydrodynamic sealing lip 3, when installed, is of an abrupt substantially circular form that is substantially aligned with the direction of relative rotation, and is adapted to exclude intrusion of the second fluid 40, in accordance with the teachings of commonly assigned U.S. Pat. No. 4,610,319. Dynamic exclusionary intersection 12 is of a configuration developing substantially no hydrodynamic wedging activity during relative rotation between hydrodynamic sealing lip 3 and relatively rotatable surface 36. Dynamic exclusionary intersection 12 presents a scraping edge to help exclude contaminant material from the interfacial contact footprint between hydrodynamic sealing lip 3 and relatively rotatable surface 36 in the event of any relative movement occurring perpendicular to the direction of relative rotation between hydrodynamic sealing lip 3 and relatively rotatable surface 36 (i.e., movement occurring from right to left or left to right in FIG. 1B).

Relatively rotatable surface 36 of second machine component 48 and peripheral wall 34 of first machine component 46 are in spaced relation to each other. The spacing of relatively rotatable surface 36 and peripheral wall 34 is sized to hold rotary seal 2 in compression. In the same manner as any conventional interference-type seal, such as an O-ring or an O-ring energized lip seal, the compression of rotary seal 2 establishes sealing between static sealing lip 16 of rotary seal 2 and peripheral wall 34 of first machine component 46, and establishes sealing between the hydrodynamic sealing lip 3 of rotary seal 2 and the relatively rotatable surface 36 of second machine component 48.

The purpose of rotary seal 2 is to establish sealing engagement with the relatively rotatable surface 36 of the second machine component 48 and the first machine component 46, to retain a volume of the first fluid 38, to partition the first fluid 38 from the second fluid 40, and to exclude the second fluid 40 and prevent intrusion of the second fluid 40 into the first fluid 38.

At least a portion of the hydrodynamic sealing lip 3 is held in compressed, contacting relation with relatively rotatable surface 36 of the second machine component 48. In dynamic operation, the relatively rotatable surface 36 has relative rotation with respect to hydrodynamic sealing lip 3 of the rotary seal 2 and with respect to the first machine component 46. The present invention has application where either the first machine component 46 or the second machine component 48, or both, are individually rotatable.

The compression (i.e., compressed, contacting relation) of hydrodynamic sealing lip 3 against the relatively rotatable surface 36 establishes and defines an interfacial contact footprint between hydrodynamic sealing lip 3 and relatively rotatable surface 36, as taught by the commonly assigned prior art identified above. The footprint has a non-circular first footprint edge 52 that faces the first fluid 38, and a second footprint edge 54 of generally circular configuration that faces the second fluid 40, as taught by the commonly assigned prior art identified above. Thus, the width W of the footprint varies about the circumference of seal body 4 from a minimum width to a maximum width. FIGS. 1A and 1B are representative of a location of the hydrodynamic sealing lip 3 that produces the minimum width W of the footprint.

When relative rotation is absent, a liquid-tight static sealing relationship is maintained at the interface between hydrodynamic sealing lip 3 and relatively rotatable surface 36, and between static sealing lip 16 and peripheral wall 34. When relative rotation occurs between first machine component 46 and relatively rotatable surface 36, the rotary seal 2 preferably remains stationary with respect to peripheral wall 34 of first machine component 46 and maintains a static sealing relationship therewith, while the interface between hydrodynamic sealing lip 3 and relatively rotatable surface 36 of second machine component 48 becomes a dynamic sealing interface such that relatively rotatable surface 36 slips with respect to hydrodynamic sealing lip 3 at a given rotational velocity. When relative rotation between hydrodynamic sealing lip 3 and relatively rotatable surface 36 ceases, the interfacial contact footprint between hydrodynamic sealing lip 3 and relatively rotatable surface 36 returns to being a static sealing interface.

Because the footprint between hydrodynamic sealing lip 3 and relatively rotatable surface 36 has a first footprint edge 52 that is intentionally non-circular (i.e., wavy), it, in conjunction with the deformed shape of hydrodynamic sealing lip 3, produces a hydrodynamic wedging action in response to relative rotation between the rotary seal 2 and relatively rotatable surface 36. This hydrodynamic wedging action forces a film of the first fluid 38 into the interfacial contact footprint between the hydrodynamic sealing lip 3 and relatively rotatable surface 36 for lubrication purposes, which reduces wear, torque and heat generation. In other words, hydrodynamic sealing lip 3 slips or hydroplanes on a film of lubricating fluid during periods of relative rotation between the hydrodynamic sealing lip 3 and relatively rotatable surface 36. When relative rotation stops, the hydroplaning activity stops, and a static sealing relationship is re-established between hydrodynamic sealing lip 3 and relatively rotatable surface 36 due to the compression of hydrodynamic sealing lip 3 against relatively rotatable surface 36.

The hydroplaning activity that occurs during relative rotation minimizes or prevents the typical dry rubbing wear and high friction associated with conventional non-hydrodynamic rubber and plastic seals, prolonging the useful life of the rotary seal 2 and the life of the relatively rotatable surface 36, and making higher speed, compression and differential pressure practical.

Due to second footprint edge 54 being substantially circular and substantially aligned with the possible directions of relative rotation, second footprint edge 54 does not produce a hydrodynamic wedging action in response to relative rotation between the hydrodynamic sealing lip 3 and the relatively rotatable surface 36, thereby facilitating exclusion of the second fluid 40 in accordance with the teachings of commonly assigned U.S. Pat. No. 4,610,319.

The non-circular, wavy configuration of first footprint edge 52 can take any desirable form where at least a portion is skewed with respect to the direction of relative rotation, and can take the form of one or more repetitive or non-repetitive convolutions/waves of any form including a sine, saw-tooth or square wave configuration, or plural straight or curved segments forming a tooth-like pattern, or one or more parabolic curves, cycloid curves, witch/versiera curves, elliptical curves, etc. or combinations thereof, including, but not limited to, any of the lubricant-side footprint edge configurations shown in U.S. Pat. Nos. 4,610,319 and 6,109,618, or U.S. Application Pub. No. 2006/0214380.

At least a portion of the static sealing lip 16 is in compressed contact with the peripheral wall 34. The compression of installation preferably causes the seal body 4 to twist, causing the twist-limiting surface 26 to twist into a position of contact or close-proximity with the peripheral wall 34, as shown. This twisting tendency increases with temperature due to the differential thermal expansion between rotary seal 2 and first machine component 46, and thus the contact between twist-limiting surface 26 and peripheral wall 34 tends to increase with increasing temperature. The twist-limiting surface 26 cooperates with peripheral wall 34 to allow a predetermined amount of cross-sectional twisting of the installed rotary seal 2 within the circular seal groove, for establishing more optimum contact pressure in the interfacial contact footprint near dynamic exclusionary intersection 12. The twisting of the seal body 4 also causes the first end 5 and the second end 6 to twist into a position that is preferably more or less normal to (i.e., at right angles with) the relatively rotatable surface 36. The twisting of the seal body 4 causes an increase in interfacial contact pressure near the dynamic exclusionary intersection 12 that is very beneficial to environmental exclusion, especially in zero differential pressure conditions. The amount of interfacial contact pressure near the dynamic exclusionary intersection 12 is controllable by the amount of twist that is permitted by the angle A selected for twist-limiting surface 26 (i.e. the angle A between peripheral wall 34 and twist-limiting surface 26, in the uninstalled condition of the rotary seal 2 as shown in FIG. 1A). Because compression of the rotary seal 2 during installation causes a greater length increase to the seal body 4 at the locations corresponding to the largest portions of the hydrodynamic sealing lip 3 and the static sealing lip 16, the first end 5, which was wavy in the uncompressed condition, becomes more or less circular in the compressed condition (i.e., first end 5 becomes less wavy; having improved circularity).

The compressed configuration of the rotary seal 2 shown in FIG. 1B is representative of its position when the pressure of first fluid 38 is substantially the same as the pressure of second fluid 40. If the pressure of second fluid 40 was substantially higher than the pressure of the first fluid 38, the resulting differential pressure would force the first end 5 of rotary seal 2 against the first wall 44. If the pressure of first fluid 38 was substantially greater than the pressure of the second fluid 40, the resulting differential pressure would force the second end 6 of the rotary seal 2 against the second wall 42.

Since the compressed shape of the second end 6 of the seal has improved circularity and is substantially the same as the shape of the second wall 42, the seal cross-section does not distort significantly as contact occurs due to differential pressure acting across rotary seal 2, therefore the effect on the contact pressure gradients in the interfacial contact footprint between the hydrodynamic sealing lip 3 and the relatively rotatable surface 36 is minimized. The differential pressure acting across the rotary seal 2 will cause the magnitude of interfacial contact pressure to change, but the contact pressure gradients (i.e., slope of the contact pressure graph) are not changed as much as they were in the prior art because the seal 2 does not twist or distort as much when the second end 6 of the seal is forced by pressure into contact with the second wall 42. Since the contact pressure gradients are less undisturbed, the exclusionary performance and hydrodynamic lubricating performance are more consistent across varying conditions of differential pressure.

As mentioned above, the twisting of the seal body 4 during installation preferably causes the first end 5 and the second end 6 to rotate into a position that is more or less normal to (i.e., at a right angle with) the relatively rotatable surface 36. As mentioned above, because compression of the rotary seal 2 during installation causes a greater length increase to the seal body 4 at the locations corresponding to the largest portions of the hydrodynamic sealing lip 3 and the static sealing lip 16, the first end 5, which was wavy in the uncompressed condition, becomes substantially circular in the compressed condition, or at least less wavy (i.e., having improved circularity). In other words, the length of the seal body 4 becomes substantially uniform, or at least more uniform, about the circumference of seal body 4.

Thus, the deformation of the seal body 4 as a result of installation brings the first end 5 into an installed condition which is preferably substantially parallel to the first wall 44. If the pressure of the second fluid 40 is higher than the pressure of the first fluid 38, the differential pressure will force the first end 5 of the seal body 4 into contact with the first wall 44. Since the installed shape of the first end 5 is substantially circular, the dynamic exclusionary intersection 12 remains substantially circular, unlike the prior art. In other words, because of the improved circularity of the first end 5 in installed conditions, and the more uniform length of the seal body 4, the circularity of the dynamic exclusionary intersection 12 is improved over the prior art in conditions when the first end 5 is forced against the first wall 44 by pressure. This results in an increase in abrasive exclusion when compared to the prior art.

The anti-rotation discontinuities 28 engage mating discontinuities 56 in the peripheral wall 34, and prevent the static sealing lip 16 from slipping circumferentially with respect to the peripheral wall 34. In FIG. 1B, the mating discontinuities 56 take the form of recesses, but other specific forms of the mating discontinuities 56 are possible without departing from the spirit or scope of the invention.

Although the seal body 4 is shown as having an installed length that is shorter than the distance between the second wall 42 and the first wall 44, the teachings of the invention are also suitable for seals built to withstand simultaneous contact with both the second wall 42 and the first wall 44 in accordance with the teachings of commonly assigned U.S. Pat. Nos. 5,873,576; 6,036,192; and 6,315,302.

Relatively rotatable surface 36 can take the form of an externally or internally oriented substantially cylindrical surface, as desired, with rotary seal 2 compressed radially between peripheral wall 34 and relatively rotatable surface 36, in which case the axis of relative rotation would be substantially parallel to relatively rotatable surface 36. In a radial sealing configuration, hydrodynamic sealing lip 3 is oriented for compression in a substantially radial direction, and peripheral wall 34 may be of substantially cylindrical configuration, and first wall 44 and second wall 42 may, if desired, be of substantially planar configuration.

Alternatively, relatively rotatable surface 36 can take the form of a substantially planar surface, with rotary seal 2 compressed axially between peripheral wall 34 and relatively rotatable surface 36 in a "face-sealing" arrangement, in which case the axis or relative rotation would be substantially perpendicular to relatively rotatable surface 36. In an axial (face) sealing configuration, hydrodynamic sealing lip 3 would be oriented for compression in a substantially axial direction, peripheral wall 34 may be of substantially planar configuration, and first wall 44 and second wall 42 may, if desired, be of substantially cylindrical configuration.

In the most common configuration, relatively rotatable surface 36 is an external cylindrical surface formed by an exterior surface of a shaft or sleeve.

In summary, the seal can be used as a radial seal or a face seal by configuring the hydrodynamic sealing lip 3 to be located at either the inside diameter, the outside diameter, or the end of the seal, while maintaining the advantages of the invention that are disclosed herein.

Simplified embodiments are possible wherein one or more of the features that are described above are omitted. For example, in small diameter applications, slippage of the seal with respect to the groove is less of a problem because the moment arm from the theoretical axis of the seal to the static interface is much larger proportionately than the moment arm to the dynamic interface, therefore the anti-rotation discontinuities 28 could be eliminated as a simplification. For another example, as an expedient, one could improve the performance of seals made from existing tooling by substituting a mold component so that the static lip has variable dimensions around the circumference of the seal body 4, without changing other aspects of the seal.

Alternate embodiments are also possible, where one or more of the features that are described above are combined with different features of the prior art. For example, in the uncompressed condition thereof, dynamic sealing surface 10 and/or static sealing surface 18 may, if desired, be of sloped configuration, angulated with respect to the respective mating surfaces of the first machine component 46 and second machine component 48, in accordance with the teachings of commonly assigned U.S. Pat. No. 6,767,016. These, and other simplifications and alternate embodiments will be discussed in conjunction with the remaining FIGURES.

FIG. 1C is another view of the uninstalled condition of the rotary seal 2 that was shown in FIGS. 1A and 1B. FIG. 1D is a fragmentary section view taken at the cutting plane of Section ID-ID of FIG. 1C and represents a location where the dimensions of hydrodynamic sealing lip 3 and static sealing lip 16 are maximum. FIG. 1A is taken at the cutting plane of Section 1A-1A of FIG. 1C and represents a location where the dimensions of hydrodynamic sealing lip 3 and static sealing lip 16 are minimum. For convenience of illustration, FIG. 1C is drawn to be representative of a seal 2 of infinite or near infinite diameter, so that the effects of curvature-related foreshortening can be ignored.

In FIG. 1C, the static lip corner 24 varies in position around the circumference of seal body 4, and the shape of the static sealing lip 16 varies in dimension around the circumference of seal body 4, to provide the improved compressive symmetry previously described. In FIG. 1C, it can be seen that in the uninstalled condition the first end 5 is wavy by length variation dimension 32, such that the minimum length dimension $L_{min}$ occurs at Cutting Plane 1D-1D, and the maximum length dimension $L_{max}$ occurs at Cutting Plane 1A-1A. When installed, the Length $L_{max}$ at Cutting Plane 1A-1A and the Length $L_{min}$ at cutting Plane 1D-1D become more equal, as a result of the compression effects previously discussed. In FIG. 1C, the dynamic exclusionary intersection 12, static sealing surface 18, static exclusionary intersection 20, static lip flank 22, twist-limiting surface 26, anti-rotation discontinuities 28, offset dimension 29 and the length variation dimension 32 are labeled to orient the reader, bearing in mind that features throughout this specification that are represented by like numbers have the same basic function.

In FIG. 1D, the seal body 4, first end 5, second end 6, dynamic sealing surface 10, dynamic exclusionary intersection 12, lubricant side flank 14, blending feature 15, static sealing lip 16, static sealing surface 18, static exclusionary intersection 20, static lip flank 22, static lip corner 24 and the twist-limiting surface 26 are labeled to orient the reader, bearing in mind that features throughout this specification that are represented by like numbers have the same basic function. By comparing FIGS. 1A and 1D, it can clearly be seen that the size and cross-sectional area of the hydrodynamic sealing lip 3 and the static sealing lip 16 are greater in FIG. 1D.

FIG. 1E

FIG. 1E is an alternate embodiment of the present invention, and is shown in the same orientation as FIG. 1C. As with FIG. 1C, FIG. 1E is drawn to be representative of a seal of infinite or near infinite diameter, so that the effects of curvature-related foreshortening can be ignored.

FIG. 1A is also representative of the cross-section at the cutting plane 1A-1A of FIG. 1E, and FIG. 1D is also representative of the cross-section at the cutting plane 1D-1D of FIG. 1E. The major difference between the seals 2 of FIGS. 1C and 1E is that in FIG. 1C the size of the static sealing lip 16 varied smoothly, while in FIG. 1E the size of the static sealing lip 16 varies in step-like configuration.

In FIG. 1E, the static lip corner 24 varies in position around the circumference of seal body 4, and the shape of the static sealing lip 16 varies in dimension around the circumference of seal body 4 in a stepped configuration, to provide the improved compressive symmetry previously described. The possible directions of relative rotation between rotary seal 2 and the relatively rotatable surface (not shown) is shown by arrow 60. As a result of the step-like variation of the size of the static sealing lip 16, it can be seen that parts of the static lip corner 24 are substantially parallel to the possible directions of relative rotation, and parts of the static lip corner 24 are substantially perpendicular to the possible directions of relative rotation. This is preferred to the arrangement shown in FIG. 1C because the static lip of FIG. 1E is less likely to slip with respect to the first machine component (not shown).

In FIG. 1E, it can be seen that in the uninstalled condition, the first end 5 is wavy by length variation dimension 32, such that the minimum length dimension $L_{min}$ occurs at Cutting Plane 1D-1D, and the maximum length dimension $L_{max}$ occurs at Cutting Plane 1A-1A. When installed, the Length $L_{max}$ at Cutting Plane 1A-1A and the Length $L_{min}$ at cutting Plane 1D-1D become more equal as a result of the compression effects previously discussed. In FIG. 1E, the dynamic exclusionary intersection 12, offset dimension 29, static sealing surface 18, static exclusionary intersection 20, static lip flank 22, twist-limiting surface 26 and the anti-rotation discontinuities 28 are labeled to orient the reader, bearing in mind that features throughout this specification that are represented by like numbers have the same basic function.

The number of steps in the static sealing lip 16 can vary from the number shown without departing from the spirit or scope of the invention. The optimum corner location 70 is represented by a phantom line in FIG. 1E, and represents the optimum location of static lip corner 24 at any circumferential location. When the stepped-configuration style of static sealing lip 16 is used, the step height H of each step preferably straddles the optimum corner location 70 as shown in FIG. 1E. The stepped configuration causes the width 78 (FIG. 1A) to vary in a stepped configuration.

FIGS. 1F and 1G

Referring momentarily back to FIG. 1B, a static sealing interfacial contact footprint is established between the static sealing lip 16 and the first machine component 46. FIGS. 1F and 1G are representative of the shape of the static sealing interfacial contact footprint that is produced by the static lip configurations of FIGS. 1C and 1E, respectively. In FIGS. 1F and 1G, the static sealing interfacial contact footprint is shown generally at 62. Each footprint 62 has a first static footprint edge 64 and a second static footprint edge 66. In FIG. 1F, the first static footprint edge 64 is curved, and in FIG. 1G the first static footprint edge 64 is stepped. The first static footprint edge 64 of both FIGS. 1F and 1G has at least some portions that are non-aligned with the possible directions of relative rotation represented by arrow 60. The second static footprint edge 66 of both FIGS. 1F and 1G is substantially aligned with the possible directions of relative rotation represented by arrow 60. In both FIGS. 1F and 1G, a zone of elevated contact pressure 68 is present that inhibits entry of the first fluid into the static sealing interfacial contact footprint 62, thus inhibiting lubrication-related slippage at the static sealing interfacial contact footprint 62.

Figure 2A:
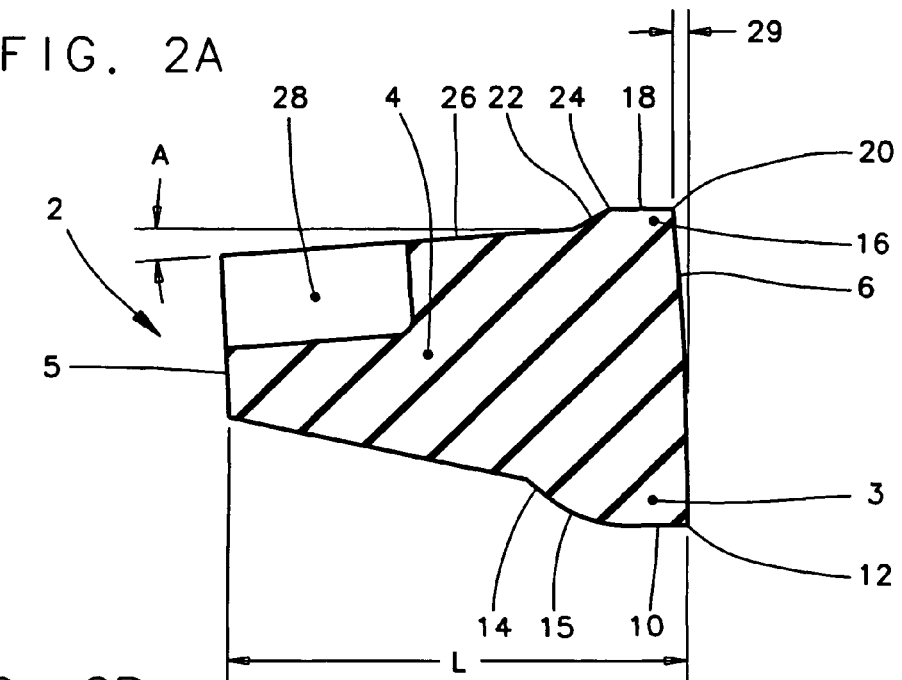
FIG. 2A is a fragmentary cross-sectional view representing the uncompressed cross-sectional configuration of another embodiment of the ring-shaped hydrodynamic seal according to the present invention.
Figure 2B:
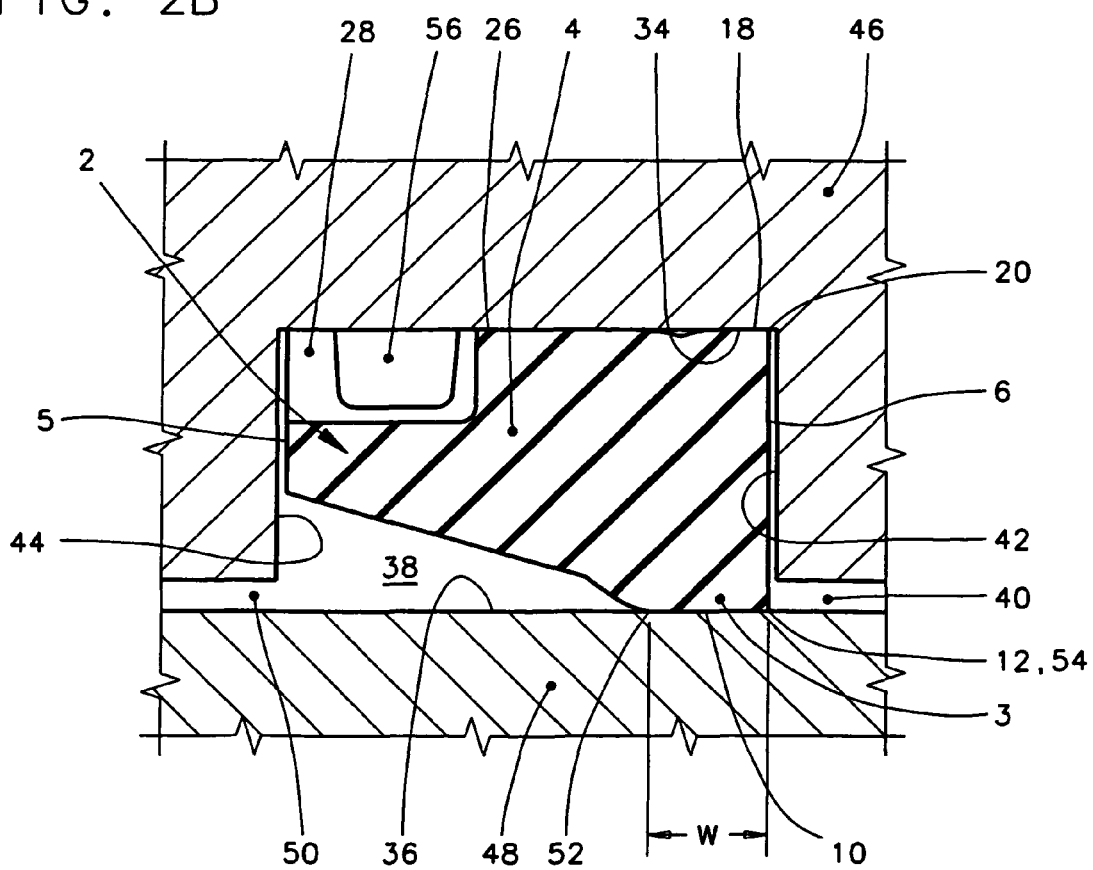
FIG. 2B is a fragmentary cross-sectional view of the hydrodynamic seal of FIG. 2A showing the compressed cross-sectional configuration in conjunction with first and second machine components.

FIGS. 2A and 2B

FIGS. 2A and 2B represent the uninstalled and installed conditions, respectively, of an alternate embodiment of the present invention where the anti-rotation discontinuities 28 are recesses in the seal body 4 of rotary seal 2, rather than being the projecting form that was shown in FIGS. 1A and 1B. As shown in FIG. 2B, the anti-rotation discontinuities 28 engage mating discontinuities 56 that extend from the first machine component 46, and prevent the static sealing surface 18 from slipping circumferentially with respect to the peripheral wall 34. With the exception of the form of the anti-rotation discontinuities 28 and the mating discontinuities 56, all other aspects of FIGS. 2A and 2B are the same as FIGS. 1A and 1B. In FIGS. 2A and 2B, the features of the seal and machine components are correspondingly labeled to orient the reader, bearing in mind that features throughout this specification that are represented by like numbers have the same basic function. In being angulated, twist-limiting surface 26 can be conical, or can as an additional optimization, the angle A of twist-limiting surface 26 can change around the circumference of seal body 4 such that twist-limiting surface 26 is a wavy surface, the waves of the wavy surface being substantially in time with the dimensional variation of the hydrodynamic sealing lip 3, to obtain a further improvement in installed circularity of the seal body 4 in general, and of the second end 6 and the dynamic exclusionary intersection 12 in particular.

FIG. 3

FIG. 3 shows a simplification of the present invention, where the anti-rotation discontinuities 28 that were shown in FIGS. 1A and 1B have been eliminated and friction between the static sealing surface 18 and the peripheral wall 34 is relied upon to prevent slippage between the rotary seal 2 and the first machine component 46. With the exception of the elimination of the anti-rotation discontinuities 28 and the mating discontinuities 56 of FIGS. 1A and 1B, all other aspects of the simplified seal 2 of FIG. 3 are the same as the seal 2 of FIGS. 1A and 1B. In FIG. 3, the features of the seal and machine components are correspondingly labeled to orient the reader, bearing in mind that features throughout this specification that are represented by like numbers have the same basic function.

FIG. 4

FIG. 4 also shows a simplification of the present invention, where the anti-rotation discontinuities 28 that were shown in FIGS. 1A and 1B have been eliminated. The seal body 4 of rotary seal 2 is shown as having an installed length that causes it to simultaneously contact the second wall 42 and the first wall 44 in accordance with the teachings of commonly assigned U.S. Pat. No. 6,315,302 in at least some operating temperature conditions. In other words, when installed, at least part of the first end 5 of seal body 4 contacts the first wall 44 of first machine component 46, and at least part of the second end 6 of seal body 4 contacts the second wall 42 of first machine component 46 to inhibit skew-induced wear. The rotary seal 2 relies upon friction with the peripheral wall 34, the second wall 42 and the first wall 44 to prevent or reduce slippage with respect to the first machine component 46. In FIG. 4, the features of the seal and machine components are correspondingly labeled to orient the reader, bearing in mind that features throughout this specification that are represented by like numbers have the same basic function.

In an axially constrained seal as shown in FIG. 4, the twisting of the seal body 4 allows good control of contact pressure in the interfacial contact footprint near dynamic exclusionary intersection 12, without the need for the exclusion edge chamfer of previous commercial axially-constrained seals. This makes the design of the seal more compatible with small cross-sections, allowing the distance between peripheral wall 34 and relatively rotatable surface 36 to be reduced, so that the rotary seal 2 fits within a smaller envelope. The angulation of first end 5, second end 6 and twist-limiting surface 26 in the uncompressed condition (as described in conjunction with previous figures such as FIG. 1A) reduces overall seal volume, making it more compatible with axial constraint, since less overall seal volume means that there is less differential thermal expansion between rotary seal 2 and first machine component 46 that has to be accommodated. This allows smaller cross-section and/or smaller diameter seals to be manufactured that are still compatible with installed axial constraint.

FIGS. 5A and 5B

The tooling for the standard Kalsi Seal can be modified to produce an improved seal that incorporates several key features of the present invention, for improved exclusion edge contact pressure and improved exclusion edge circularity. The resulting seal is a simplification of the seal that was shown in FIGS. 1A and 1B. FIGS. 5A and 5B are different views of a seal 2 in the uninstalled condition that is made from such modified tooling. FIG. 5B is a fragmentary section view taken at the location where the hydrodynamic sealing lip 3 and the static sealing lip 16 are at their least dimensional size, and FIG. 5A is a three dimensional isometric view showing a fragment of the same seal. For orientation purposes, it should be understood that in the cross-sectional view of FIG. 5B, the cutting plane is aligned with and passes through the theoretical axis of the seal. Referring now to FIGS. 5A and 5B, the uncompressed rotary seal of the present invention is shown generally at 2. Rotary seal 2 is of generally circular, ring-like configuration, and includes a hydrodynamic sealing lip 3 and a static sealing lip 16 in generally opposed relation. Rotary seal 2 is constructed of sealing material, such as an elastomer, or a combination of one or more elastomers, or a combination of a suitable plastic and an elastomer, as taught by the commonly assigned prior art.

Rotary seal 2 has a generally circular seal body 4 that has a first end 5 and a second end 6 that are in generally opposed relation. The hydrodynamic sealing lip 3 projects from the seal body 4 radially inward, as can best be seen in FIG. 5B. Hydrodynamic sealing lip 3 varies in its cross-sectional dimensions about the circumference of seal body 4, in accordance with the teachings of the commonly assigned patents and patent applications noted above, to cause hydrodynamic wedging activity in response to relative rotation when installed. When pressed against a relatively rotatable surface, the hydrodynamic sealing lip 3 establishes an interfacial contact footprint with respect to the relatively rotatable surface that has a non-circular, wavy lubricant-side edge and a substantially circular environment-side edge, in accordance with the above-noted commonly assigned patents and patent applications.

The hydrodynamic sealing lip 3 incorporates a dynamic sealing surface 10. The cross-sectional profile of dynamic sealing surface 10 can be any suitable shape, including straight or curved lines or line combinations, and shapes that vary around the circumference of seal body 4, as taught by the commonly assigned prior art referenced above. The hydrodynamic sealing lip 3 also incorporates a dynamic exclusionary intersection 12 that is generally circular. If desired, the dynamic exclusionary intersection 12 can be formed by an intersection between the second end 6 and the dynamic sealing surface 10, as shown. The hydrodynamic sealing lip 3 preferably has a lubricant side flank 14 that is non-circular, in accordance with the teachings of the commonly assigned patents and patent applications noted above. The lubricant side flank 14 is preferably blended to the dynamic sealing surface 10 by a blending feature 15 over at least part of the circumference of seal body 4. This blending feature 15, as taught by the commonly assigned prior art, can take many different forms, including forms that vary in shape about the circumference of seal body 4.

A static sealing lip 16 projects from the seal body 4 in substantially opposed relation to the hydrodynamic sealing lip 3, in a generally radially outward direction. The static sealing lip 16 varies in its dimensions about the circumference of seal body 4, approximately in time with the variance of the dimensions of the hydrodynamic sealing lip 3, to provide improved compressive symmetry between the static and dynamic sealing lips, as compared to the prior art. This improved compressive symmetry provides improved interfacial contact pressure near dynamic exclusionary intersection 12 in conditions of little or no differential pressure, and therefore improves environmental exclusion.

The static sealing lip 16 incorporates a static sealing surface 18 and preferably incorporates a static exclusionary intersection 20 that is generally circular. If desired, the static exclusionary intersection 20 can be formed by an intersection between the second end 6 and the static sealing surface 18, as shown.

The static sealing lip 16 has a static lip flank 22 that preferably varies in position from the second end 6 about the circumference of seal body 4 in step-like fashion. Preferably, the static lip flank 22 intersects the static sealing surface 18 to form a static lip corner 24. When installed in a compressed condition, this static lip corner 24 produces a local contact pressure spike in the static sealing interface, which inhibits hydrodynamic lubrication of the static sealing surface 18 in response to relative motion, and therefore helps to prevent slippage of the rotary seal 2 when installed.

As can best be seen in FIG. 5A, the static lip corner 24 varies in position around the circumference of seal body 4, and the shape of the static sealing lip 16 varies in dimension around the circumference of seal body 4, to provide the improved compressive symmetry previously described.

The seal body 4 incorporates a twist-limiting surface 26 that is preferably angulated as shown, and in being angulated is designed to allow the seal body 4 to twist slightly when installed, to increase contact pressure in the dynamic sealing interface near the dynamic exclusionary intersection 12. As viewed in FIG. 5B, the aforementioned twisting of the seal body 4 as a result of compression during installation would be in a clockwise direction.

FIG. 6

Figure 6:
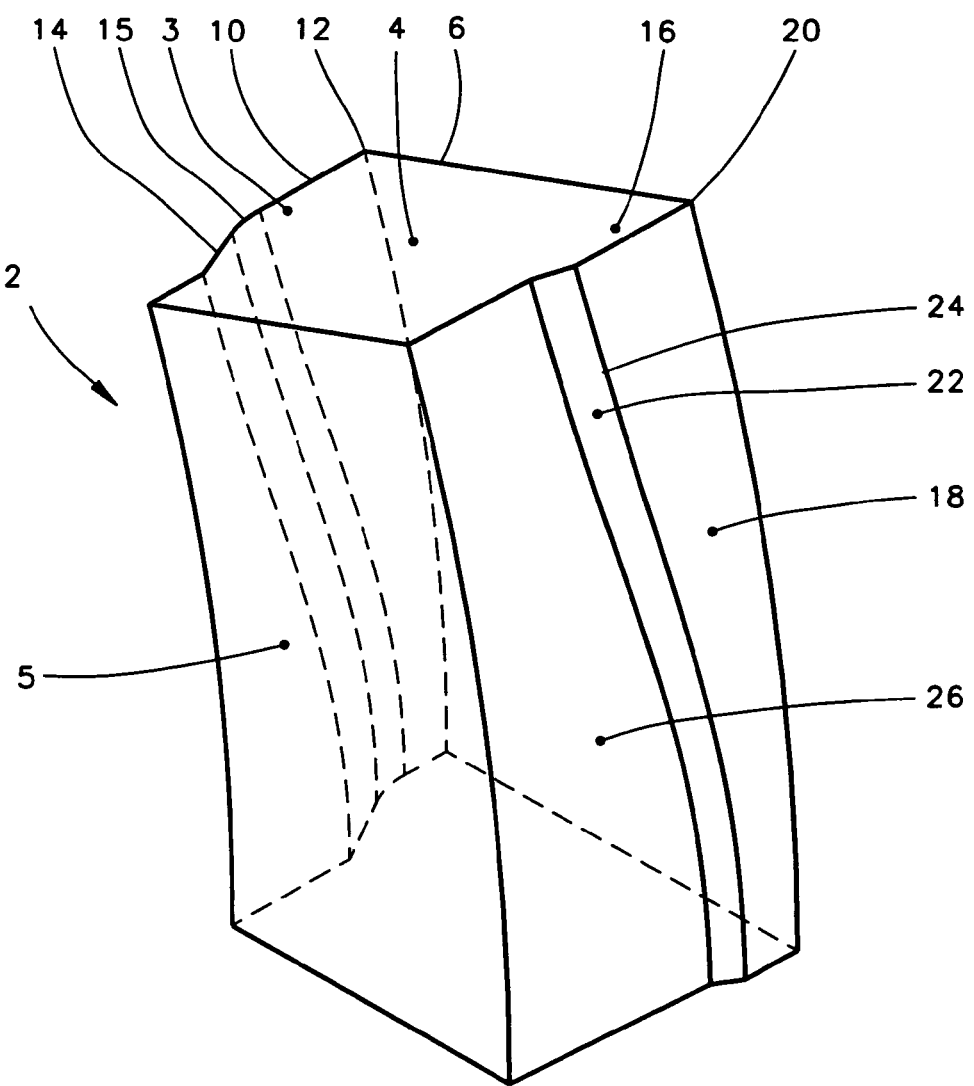
FIGS. 6 and 7 are fragmentary perspective views representing the uncompressed configuration of other embodiments of the ring-shaped hydrodynamic seal according to the present invention.

The uninstalled seal shown in FIG. 6 is an alternate embodiment of the seal shown in FIGS. 5A and 5B. FIG. 6 is a three dimensional isometric view showing a fragment of the uncompressed rotary seal 2. Rotary seal 2 is of generally circular, ring-like configuration, and includes a hydrodynamic sealing lip 3 and a static sealing lip 16 in generally opposed relation. The static lip corner 24 varies in position around the circumference of seal body 4, and the shape of the static sealing lip 16 thus varies in dimension around the circumference of seal body 4, to provide the improved compressive symmetry previously described. In FIG. 6, the seal body 4, first end 5, second end 6, dynamic sealing surface 10, dynamic exclusionary intersection 12, lubricant side flank 14, blending feature 15, static sealing surface 18, static exclusionary intersection 20, static lip flank 22, static lip corner 24, and the twist-limiting surface 26 are labeled to orient the reader, bearing in mind that features throughout this specification that are represented by like numbers have the same basic function.

FIG. 7

Figure 7:
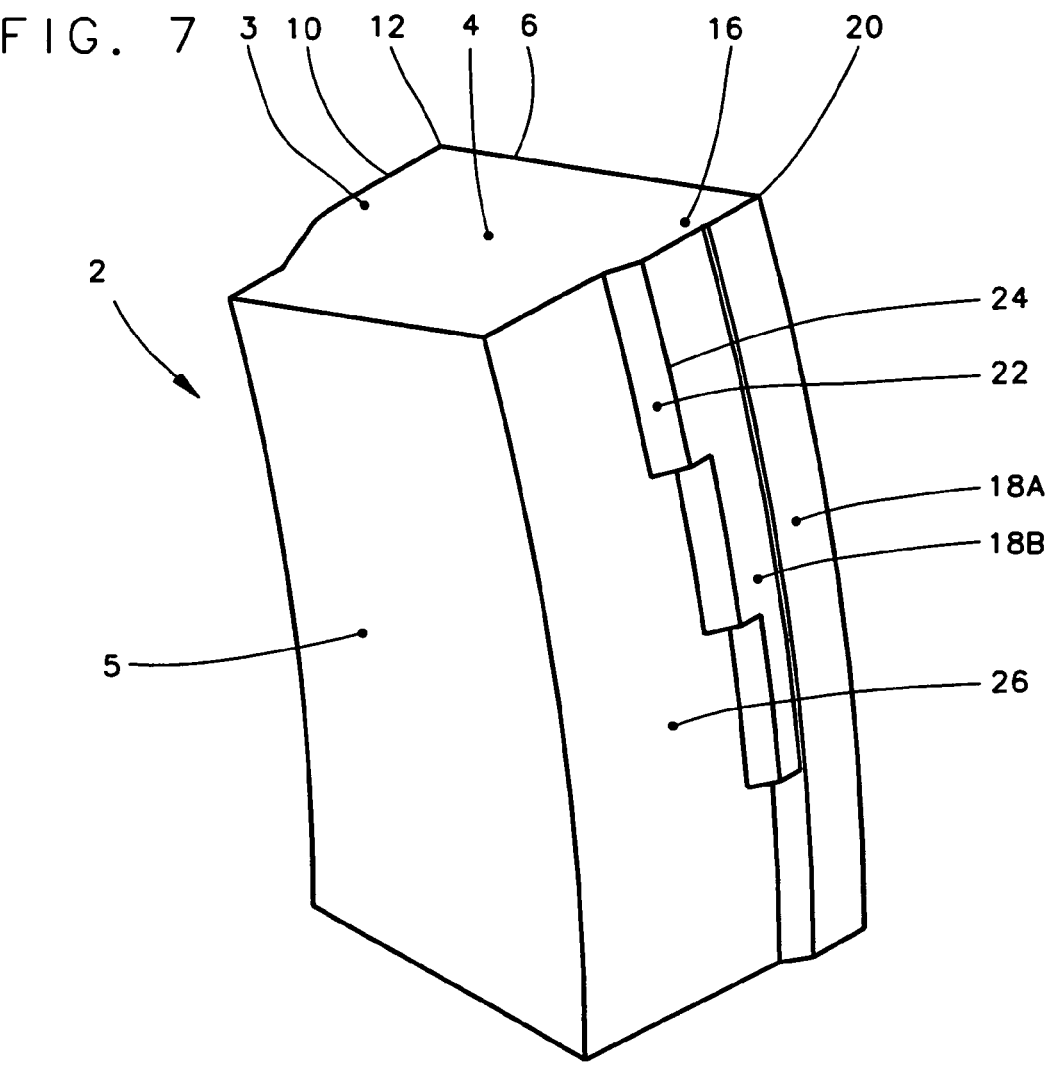

FIG. 7 is a three dimensional isometric view showing a fragment of an alternate embodiment of the invention. Rotary seal 2 is of generally circular, ring-like configuration, and includes a hydrodynamic sealing lip 3 and a static sealing lip 16 in generally opposed relation. In FIG. 7, the first end 5, second end 6, dynamic sealing surface 10, dynamic exclusionary intersection 12, static exclusionary intersection 20, static lip flank 22, static lip corner 24, and the twist-limiting surface 26 are labeled to orient the reader, bearing in mind that features throughout this specification that are represented by like numbers have the same basic function.

The static sealing lip 16 projects from the seal body 4 in substantially opposed relation to the hydrodynamic sealing lip 3, in a generally radially outward direction. The static sealing lip 16 varies in its dimensions about the circumference of seal body 4, approximately in time with the variance of the dimensions of the hydrodynamic sealing lip 3, to provide improved compressive symmetry between the static and dynamic sealing lips, as compared to the prior art.

The static sealing lip 16 incorporates a two level configuration, wherein static sealing surface 18A projects more than static sealing surface 18B to facilitate manufacture of the mold component that produces the static sealing lip 16. Preferably, the portion of the mold that produces the static sealing surface 18A is lathe-turned, and the portion of the mold that produces the static sealing surface 18B is produced by electrical discharge machining.

FIG. 8

Figure 8:
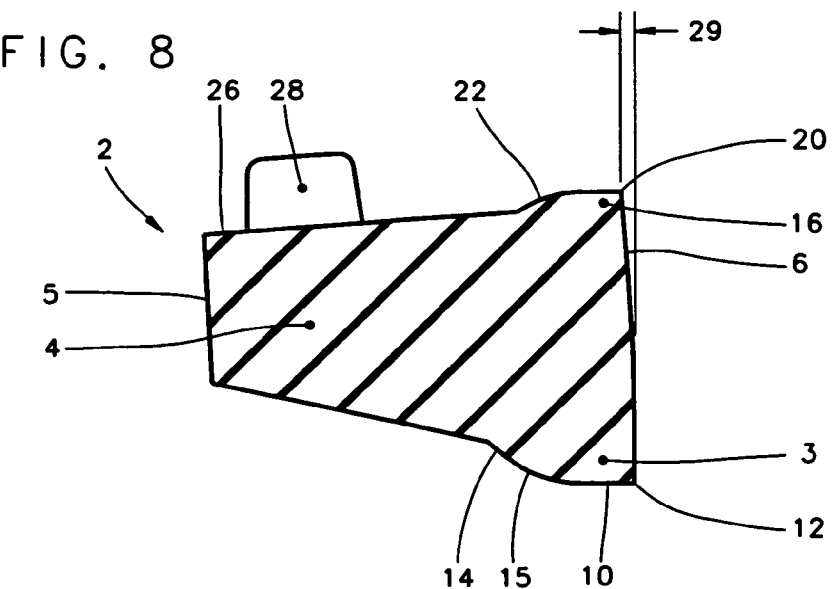
FIG. 8 is a fragmentary cross-sectional view of an alternative embodiment of the hydrodynamic seal according to the present invention, the seal shown in the uncompressed configuration.

FIG. 8 is an alternate embodiment that is identical to that of FIG. 1A, except that the static lip flank 22 on the static sealing lip 16 is curved, and the static lip corner 24 of FIG. 1A is absent. The rotary seal 2 includes anti-rotation discontinuities 28 to prevent slippage. The static lip corner 24 of FIG. 1A need not be present on the static sealing lip 16, because if the seal cannot slip rotationally, the static sealing lip 16 cannot produce hydrodynamic lubrication at the static sealing interface. In this arrangement, the shape of the static sealing lip 16 can be more similar to that of the hydrodynamic sealing lip 3 than in the previously shown embodiments, for even better compressive symmetry. In FIG. 8, the seal features are correspondingly labeled to orient the reader, bearing in mind that features throughout this specification that are represented by like numbers have the same basic function.

FIG. 9

Figure 9:
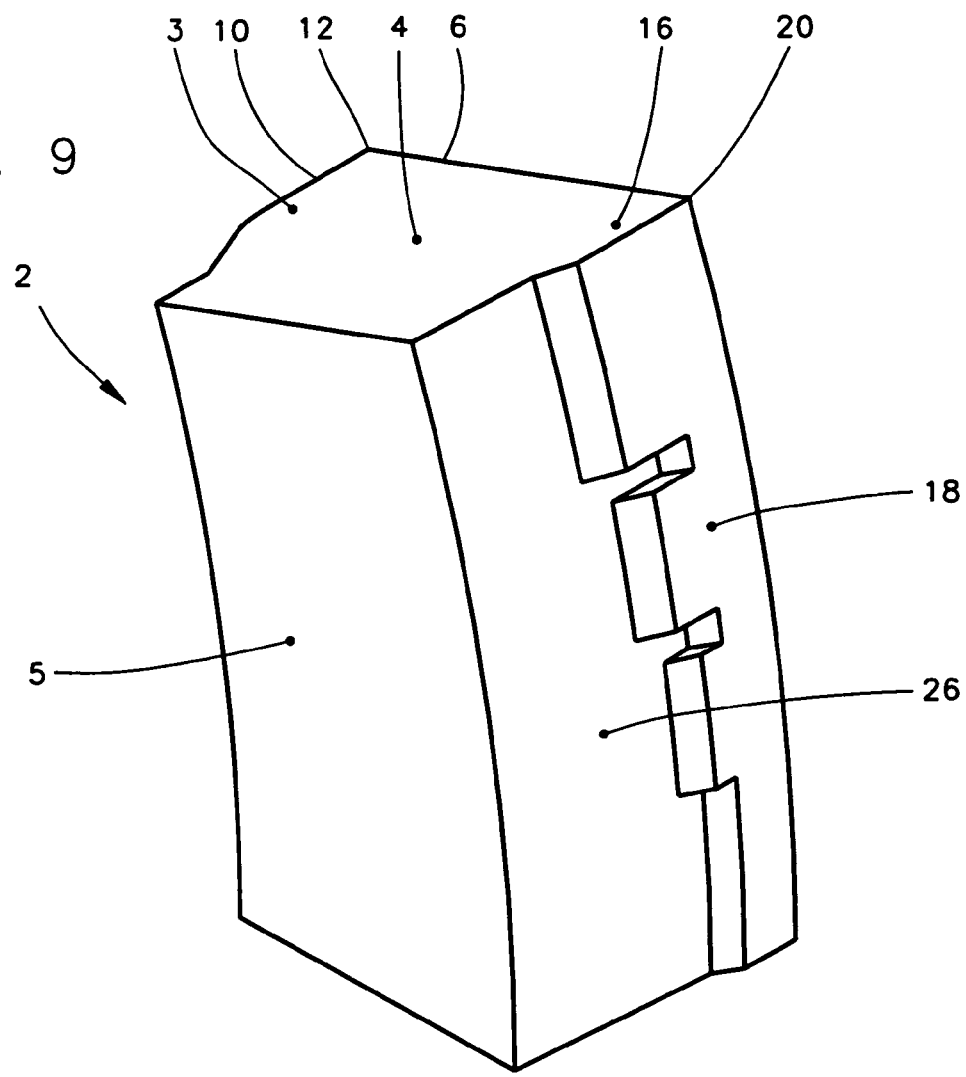
FIG. 9 is a fragmentary perspective view representing the uncompressed configuration of other embodiments of the ring-shaped hydrodynamic seal according to the present invention.

FIG. 9 is a three dimensional isometric view showing a fragment of an alternate embodiment of the invention. Rotary seal 2 is of generally circular, ring-like configuration, and includes a hydrodynamic sealing lip 3 and a static sealing lip 16 in generally opposed relation.

The static sealing lip 16 projects from the seal body 4 in substantially opposed relation to the hydrodynamic sealing lip 3, in a generally radially outward direction. The static sealing lip 16 varies in its dimensions about the circumference of seal body 4, approximately in time with the variance of the dimensions of the hydrodynamic sealing lip 3, to provide improved compressive symmetry between the static and dynamic sealing lips, as compared to the prior art. The static sealing lip 16 has a castellated/crenulated configuration, as shown.

FIG. 10

Figure 10:
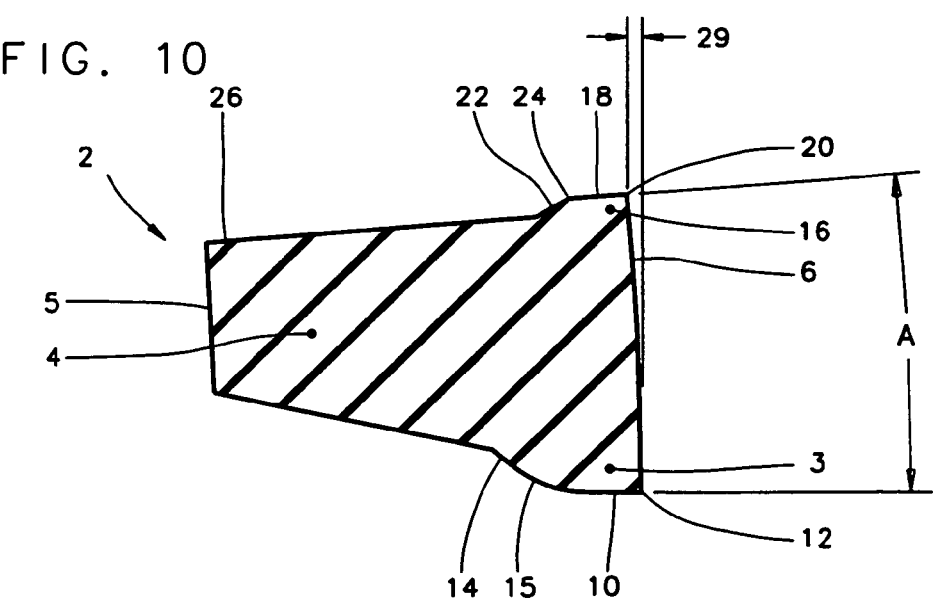
FIG. 10 is a fragmentary cross-sectional view of an alternative embodiment of the hydrodynamic seal according to the present invention, the seal shown in the uncompressed configuration.

FIG. 10 is an alternate embodiment wherein the static sealing surface 18 of the static sealing lip 16 is angulated by angle A with respect to the dynamic sealing surface 10 of the hydrodynamic sealing lip 3. The static sealing lip 16 and the hydrodynamic sealing lip 3 vary in dimension about the circumference of seal body 4, for the purposes described previously in conjunction with other figures. In FIG. 10, the seal features are correspondingly labeled to orient the reader, bearing in mind that features throughout this specification that are represented by like numbers have the same basic function. As a simplification, the anti-rotation discontinuities 28 of FIG. 1A have been omitted in FIG. 10.

In view of the foregoing it is evident that the present invention is one that is well adapted to attain all of the objects and features hereinabove set forth, together with other objects and features which are inherent in the apparatus disclosed herein.

Even though several specific hydrodynamic rotary seal and seal gland geometries are disclosed in detail herein, many other geometrical variations employing the basic principles and teachings of this invention are possible.

The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A hydrodynamic seal comprising a seal body of generally ring-shaped configuration having a circumference, said seal body comprising:
   a hydrodynamic sealing lip having a cross-sectional area that varies along said circumference;
   a static sealing lip;
   a first end; and
   a second end in generally opposed relation to said first end, a length being defined between said first end and said second end, wherein said length varies in time with said hydrodynamic sealing lip cross-sectional area and said length is greatest where said hydrodynamic sealing lip cross-sectional area is smallest.

2. A hydrodynamic sealing assembly comprising:
   a first machine component having first and second walls and a peripheral wall defining a seal groove;
   a second machine component having a relatively rotatable surface relative to said first machine component; and
   a hydrodynamic seal comprising a seal body of generally ring-shaped configuration having a circumference, said seal body comprising:
      a hydrodynamic sealing lip contacting said relatively rotatable surface, said hydrodynamic sealing lip having a cross-sectional area that varies along said circumference, said hydrodynamic sealing lip including a dynamic exclusionary intersection of abrupt substantially circular form that is substantially aligned with a direction of relative rotation between said hydrodynamic sealing lip and said relatively rotatable surface;
      a first end generally facing said first wall; and
      a second end generally facing said second wall, a length being defined between said first end and said second end, wherein in an uninstalled condition at least a portion of said first end varies in position relative to said second end substantially in time with said hydrodynamic sealing lip cross-sectional area.

3. The hydrodynamic sealing assembly of claim 2, wherein said seal body further comprises a projecting static sealing lip having a cross-sectional area that varies in a stepped configuration along said circumference.

4. The hydrodynamic sealing assembly of claim 2, wherein said first and second walls are in generally opposed relation to one another and wherein in an uninstalled condition at least a portion of said second end is angulated relative to said second wall by an offset dimension.

5. The hydrodynamic sealing assembly of claim 2, wherein in an uninstalled condition at least a portion of said first end is angulated.

6. The hydrodynamic sealing assembly of claim 2, wherein said seal body further comprises a twist-limiting surface adjacent a static sealing lip, wherein in an uninstalled condition at least a part of said twist-limiting surface is angulated relative to said peripheral wall.

7. The hydrodynamic sealing assembly of claim 2, wherein said seal body further comprises a twist-limiting surface adjacent a static sealing lip, and in said uninstalled condition said angulation of said twist-limiting surface varies along said circumference.

8. The hydrodynamic sealing assembly of claim 2, wherein said first and second walls are in generally opposed relation to one another and wherein in an uninstalled condition at least a portion of said first end is angulated relative to said first wall and at least a portion of said second end is angulated relative to said second wall.

9. The hydrodynamic sealing assembly of claim 2, further comprising:
   said seal body including an anti-rotation discontinuity; and
   said first machine component peripheral wall including a mating discontinuity, wherein said discontinuities mate to prevent rotation of said seal body relative to said first machine component.

10. The hydrodynamic sealing assembly of claim 2, wherein said anti-rotation discontinuity is a projection.

11. The hydrodynamic sealing assembly of claim 2, wherein said anti-rotation discontinuity is a recess.

12. A hydrodynamic sealing assembly comprising:
a first machine component having first and second walls and a peripheral wall defining a seal groove;
a second machine component having a rotatable surface that is rotatable relative to said first machine component; and
a hydrodynamic seal comprising a seal body of generally ring-shaped configuration having a circumference, said seal body comprising:
   a hydrodynamic sealing lip having a dynamic sealing surface contacting said relatively rotatable surface, said hydrodynamic sealing lip having a cross-sectional area that varies along said circumference;
   a static sealing lip of annular form having a static sealing surface contacting said peripheral wall;
   a twist-limiting surface generally facing said peripheral wall, said twist-limiting surface being angulated relative to said peripheral wall in an uninstalled condition and limiting the twist of said seal body in an installed condition;
   a first end; and
   a second end in generally opposed relation to said first end, a length being defined between said first and second ends, wherein in said uninstalled condition said length varies in time with said hydrodynamic sealing lip cross-sectional area and said length is greatest where said hydrodynamic sealing lip cross-sectional area is smallest 13. The hydrodynamic sealing assembly of claim 12, wherein said static sealing lip has a cross-sectional area that varies about said circumference substantially in time with said hydrodynamic sealing lip cross-sectional area.

14. A hydrodynamic seal adapted for use in a seal groove with first and second non-wavy groove walls, the hydrodynamic seal comprising a seal body of generally ring-shaped configuration having a circumference, said seal body comprising:
   a hydrodynamic sealing lip having a cross-sectional area that varies along said circumference, said hydrodynamic sealing lip including a dynamic exclusionary intersection of abrupt substantially circular form;
   a static sealing lip;
   a first end, at least a portion of said first end being wavy; and
   a second end located in generally opposed relation to said first end, a length being defined between said first end and said second end, wherein at least a portion of said first end varies in said length from said second end substantially in time with said hydrodynamic sealing lip cross-sectional area.

15. The hydrodynamic seal of claim 14, wherein said static sealing lip is a projecting lip and has a width that varies in a stepped configuration along said circumference.

16. A hydrodynamic sealing assembly for partitioning a first fluid from a second fluid and to exclude intrusion of the second fluid into the first fluid, the hydrodynamic sealing assembly comprising:
a first machine component having first and second walls and a peripheral wall defining a seal groove;
a second machine component having a rotatable surface that is rotatable relative to said first machine component; and
a hydrodynamic seal comprising a seal body of generally ring-shaped configuration having a circumference, said seal body comprising:
   a hydrodynamic sealing lip having a dynamic sealing surface contacting said relatively rotatable surface to establish a dynamic sealing interface between said hydrodynamic sealing lip and said relatively rotatable surface, and including a dynamic exclusionary intersection of abrupt substantially circular form that is substantially aligned with a direction of relative rotation between said hydrodynamic sealing lip and said relatively rotatable surface;
   a static sealing lip of annular form having a static sealing surface contacting a first portion of said peripheral wall; and
   a twist-limiting surface adjacent to said static sealing lip and generally facing a second portion of said peripheral wall, at least a portion of said twist-limiting surface being angulated relative to said peripheral wall second portion in an uninstalled condition and allowing said seal body to twist slightly when installed to increase contact pressure in said dynamic sealing interface near said dynamic exclusionary intersection.

17. The hydrodynamic sealing assembly of claim 16 wherein in said uninstalled condition said angulation of said twist-limiting surface varies along said circumference.

18. The hydrodynamic sealing assembly of claim 16, wherein said first and second walls are in generally opposed relation to one another and said seal body further comprises:
   a first end generally facing said first wall; and
   a second end generally facing said second wall, wherein in an uninstalled condition said second end is angulated relative to said second wall by an offset dimension.

19. The hydrodynamic sealing assembly of claim 16, wherein said seal body includes a first end generally facing said first wall, wherein in said uninstalled condition at least a portion of said first end is angulated relative to said first wall.

20. A method for establishing a sealed partition between an environment and a lubricant, the method comprising the steps of:
   (a) providing a seal having a generally ring-shaped body defining a hydrodynamic sealing lip;
   (b) providing a rotatable surface having at least one direction of relative rotation relative to the hydrodynamic sealing lip;
   (c) compressing the hydrodynamic sealing lip against the rotatable surface, wherein
      (i) the hydrodynamic sealing lip establishing sealing contact pressure with the rotatable surface, thereby establishing a sealing interface between the hydrodynamic sealing lip and the rotatable surface, the sealing interface having a lubricant-side edge and an environment-side edge; and
      (ii) the seal body twisting by a controlled amount to increase the magnitude of the sealing contact pressure near the environment-side edge.

21. A hydrodynamic seal comprising a seal body of generally ring-shaped configuration having a circumference, said seal body comprising:
   a hydrodynamic sealing lip having a cross-sectional area that varies along said circumference;
   a first end, at least a portion of said first end being wavy; and
   a second end in generally opposed relation to said first end, a length being defined between said first end and said second end, wherein at least a portion of said first end varies in said length from said second end substantially in time with said hydrodynamic sealing lip cross-sectional area, and said length is greatest where said hydrodynamic sealing lip cross-sectional area is smallest.

22. A method for improved circularity of a dynamic exclusionary intersection of a seal body of a rotary seal assembly when the pressure of the environment is greater than the pressure of the lubricant, the rotary seal assembly including a lubricant side gland wall, and a seal body having a lubricant end, an environment end, and a hydrodynamic sealing lip having a generally circular shape, the hydrodynamic sealing lip including a wavy lubricant side facing a lubricant, a dynamic exclusionary intersection facing an environment, and a cross-sectional area that varies around the generally circular shape, the method comprising the steps of:

a) providing at least a portion of the lubricant end of the seal body with a shape that is wavy; and b) employing the pressure of the environment against the environment end of the seal body to cause the shape of the lubricant end of the seal body to become less wavy.

* * * * *